United States Patent
Li et al.

(10) Patent No.: US 12,483,368 B2
(45) Date of Patent: Nov. 25, 2025

(54) EFFICIENT NEW RADIO-LIGHT MESSAGE A REPETITION IN TWO-STEP RANDOM ACCESS CHANNEL PROCEDURE

(71) Applicant: Qualcomm Incorporated, San Diego, CA (US)

(72) Inventors: Qiaoyu Li, Beijing (CN); Chao Wei, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 17/780,610

(22) PCT Filed: Dec. 21, 2020

(86) PCT No.: PCT/CN2020/137903
§ 371 (c)(1),
(2) Date: May 27, 2022

(87) PCT Pub. No.: WO2021/129555
PCT Pub. Date: Jul. 1, 2021

(65) Prior Publication Data
US 2023/0164845 A1    May 25, 2023

(30) Foreign Application Priority Data
Dec. 24, 2019  (WO) ............... PCT/CN2019/127762

(51) Int. Cl.
*H04L 5/00*      (2006.01)
*H04W 74/0833*   (2024.01)
(Continued)

(52) U.S. Cl.
CPC ....... *H04L 5/0051* (2013.01); *H04W 74/0833* (2013.01); *H04W 74/0836* (2024.01); *H04W 74/0838* (2024.01)

(58) Field of Classification Search
CPC ......... H04W 74/0833; H04W 74/0836; H04W 74/0838; H04L 5/0051; H04L 1/1854; H04L 1/08
See application file for complete search history.

(56) References Cited

U.S. PATENT DOCUMENTS

2019/0223222 A1    7/2019  Nagaraja et al.
2021/0051707 A1*   2/2021  Rastegardoost ...... H04W 72/23
(Continued)

FOREIGN PATENT DOCUMENTS

CN    104981022 A    10/2015
CN    108012329 A    5/2018
(Continued)

OTHER PUBLICATIONS

Intel Corporation: "Channel Structure for 2-Step RACH", 3GPP TSG RAN WG1 #96bis, R1-1904280, 3rd Generation Partnership Project, Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019, XP051699596, 11 pages, Section 1. last para, 2. 1st para, 2.2. 2nd para, after proposal 3, 3. 1st and 2 nd para, 4th bullet point, proposal 9, fig 2.
(Continued)

*Primary Examiner* — Ricky Q Ngo
*Assistant Examiner* — Kabir U Jahangir
(74) *Attorney, Agent, or Firm* — Holland & Hart LLP

(57) ABSTRACT

Methods, systems, and devices for wireless communications are described. A user equipment (UE) may receive a configuration signal configuring a set of random access opportunities over which to transmit a preamble associated with a random access procedure, each random access opportunity associated with a set of one or more uplink data opportunities. The UE may identify a repetition parameter for an uplink message. The UE may select a random access oppor-
(Continued)

tunity from the set of configured random access opportunities for transmitting the preamble based at least in part on the repetition parameter. The UE may transmit the preamble on the selected random access opportunity. The UE may transmit one or more repetitions of the uplink message based at least in part on the set of one or more uplink data opportunities associated with the selected random access opportunity.

28 Claims, 18 Drawing Sheets

(51) Int. Cl.
*H04W 74/0836* (2024.01)
*H04W 74/0838* (2024.01)

(56) References Cited

U.S. PATENT DOCUMENTS

| | | | | |
|---|---|---|---|---|
| 2021/0058971 | A1* | 2/2021 | MolavianJazi | H04W 72/23 |
| 2022/0132590 | A1* | 4/2022 | Chen | H04L 1/1893 |
| 2022/0264659 | A1* | 8/2022 | Enbuske | H04W 74/002 |
| 2022/0322454 | A1* | 10/2022 | Choi | H04W 74/0841 |
| 2022/0408478 | A1* | 12/2022 | Christoffersson | H04W 74/006 |
| 2023/0015550 | A1* | 1/2023 | Lin | H04W 74/0833 |

FOREIGN PATENT DOCUMENTS

| | | |
|---|---|---|
| CN | 108112090 A | 6/2018 |
| CN | 108289339 A | 7/2018 |
| CN | 108631978 A | 10/2018 |
| CN | 108737039 A | 11/2018 |
| CN | 108811172 A | 11/2018 |
| CN | 109729580 A | 5/2019 |
| CN | 110312312 A | 10/2019 |
| EP | 3780871 A1 | 2/2021 |
| WO | 2019216586 A1 | 11/2019 |
| WO | WO-2021114069 A1 | 6/2021 |

OTHER PUBLICATIONS

Qualcomm Incorporated: "Procedures for Two-Step RACH", 3GPP TSG-RAN WG1 Meeting #97, R1-1907256, R1-1907256 Procedures for Two-Step RACH, 3rd Generation Partnership Project, Mobile Competence Centre, 650, Route Des Lucioles, F-06921 Sophia-AntipolisCedex, France, vol. RAN WG1, May 13, 2019-May 17, 2019, Reno, USA, May 17, 2019, pp. 1-13, XP051728696.
Supplementary European Search Report—EP20906923—Search Authority—The Hague—Nov. 15, 2023.
International Search Report and Written Opinion—PCT/CN2019/127762—ISA/EPO—Jun. 17, 2020.
International Search Report and Written Opinion—PCT/CN2020/137903—ISA/EPO—Jan. 27, 2021.
LG Electronics: "Discussion on Channel Structure for 2-step RACH", 3GPP TSG RAN WG1 Meeting #99, R1-1912262, Reno, USA, Nov. 18-22, 2019, 14 Pages.

* cited by examiner

EFFICIENT NEW RADIO-LIGHT MESSAGE A REPETITION IN TWO-STEP RANDOM ACCESS CHANNEL PROCEDURE

CROSS REFERENCE TO RELATED APPLICATIONS

The present Application is a 371 national stage filing of International PCT Application No. PCT/CN2020/137903 by Li et. al., entitled "EFFICIENT NEW RADIO-LIGHT MESSAGE A REPETITION IN TWO-STEP RANDOM ACCESS CHANNEL PROCEDURE," filed Dec. 21, 2020; and claims priority to International Patent Application No. PCT/CN2019/127762 by Li et. al., entitled "EFFICIENT NEW RADIO-LIGHT MESSAGE A REPETITION IN TWO-STEP RANDOM ACCESS CHANNEL PROCEDURE," filed Dec. 24, 2019, each of which is assigned to the assignee hereof, and each of which is expressly incorporated by reference in its entirety herein.

TECHNICAL FIELD

The following relates generally to wireless communications and more specifically to random access message repetition techniques in beamformed communications.

BACKGROUND

The following relates generally to wireless communications, and more specifically to efficient New Radio (NR)-Light message A repetition in a two-step random access channel (RACH) procedure.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support efficient New Radio (NR)-Light message A repetition in two-step random access channel (RACH) procedure. Generally, the described techniques provide for improving repetition of uplink messages for reduced capability user equipment (UE). That is, some UE may be configured, or otherwise support, to perform uplink transmissions using a reduced transmit power level, a lower bandwidth, a reduced or limited number of antennas, a reduced computational complexity, and the like. Accordingly, uplink repetition may be used to recover from the loss due to fewer antennas, lower transmit power level, etc. For example, the base station may configure the UE (e.g., using a configuration signal) with a set of random access opportunities, with each random access opportunity having an associated set of one or more uplink data opportunities. Broadly, the random access opportunity may be used by the UE for transmitting a preamble (e.g., a RACH message A) during a RACH procedure. The UE may identify or otherwise determine a repetition parameter for an uplink message (e.g., the number of repetitions to be used for the uplink message), and select one of the random access opportunities based on the repetition parameter. For example, the UE may select a particular random access opportunity due to the associated uplink data opportunities having the same or more uplink data opportunities as the number of repetitions to be used for the uplink message. Accordingly, the UE may transmit the preamble to the base station on the selected random access opportunity and transmit the one or more repetitions of the uplink message using the one or more uplink data opportunities associated with the selected random access opportunity.

A method of wireless communication at a UE is described. The method may include receiving a configuration signal configuring a set of random access opportunities over which to transmit a preamble associated with a random access procedure, each random access opportunity associated with a set of one or more uplink data opportunities, identifying a repetition parameter for an uplink message, selecting a random access opportunity from the set of configured random access opportunities for transmitting the preamble based on the repetition parameter, transmitting the preamble on the selected random access opportunity, and transmitting one or more repetitions of the uplink message based on the set of one or more uplink data opportunities associated with the selected random access opportunity.

An apparatus for wireless communication at a UE is described. The apparatus may include a processor, memory coupled (e.g., operatively, communicatively, functionally, electronically, or electrically) to the processor, and instructions stored in the memory. The instructions may be executable by the processor to cause the apparatus to receive a configuration signal configuring a set of random access opportunities over which to transmit a preamble associated with a random access procedure, each random access opportunity associated with a set of one or more uplink data opportunities, identify a repetition parameter for an uplink message, select a random access opportunity from the set of configured random access opportunities for transmitting the preamble based on the repetition parameter, transmit the preamble on the selected random access opportunity, and transmit one or more repetitions of the uplink message based on the set of one or more uplink data opportunities associated with the selected random access opportunity.

Another apparatus for wireless communication at a UE is described. The apparatus may include means for receiving a configuration signal configuring a set of random access opportunities over which to transmit a preamble associated with a random access procedure, each random access opportunity associated with a set of one or more uplink data opportunities, identifying a repetition parameter for an uplink message, selecting a random access opportunity from the set of configured random access opportunities for transmitting the preamble based on the repetition parameter, transmitting the preamble on the selected random access opportunity, and transmitting one or more repetitions of the uplink message based on the set of one or more uplink data opportunities associated with the selected random access opportunity.

A non-transitory computer-readable medium storing code for wireless communication at a UE is described. The code may include instructions executable by a processor to receive a configuration signal configuring a set of random access opportunities over which to transmit a preamble associated with a random access procedure, each random access opportunity associated with a set of one or more uplink data opportunities, identify a repetition parameter for an uplink message, select a random access opportunity from the set of configured random access opportunities for transmitting the preamble based on the repetition parameter, transmit the preamble on the selected random access opportunity, and transmit one or more repetitions of the uplink message based on the set of one or more uplink data opportunities associated with the selected random access opportunity.

Some examples of the method, apparatuses, and non-transitory computer-readable medium described herein may further include operations, features, means, or instructions for determining that a second uplink message may be to be transmitted, and selecting an arbitrary random access opportunity and corresponding uplink data opportunity for transmission of the second uplink message by selecting a preamble and a demodulation reference signal resource from a non-repetition-specific preamble group and a non-repetition-specific demodulation reference signal resource pool.

Some examples of the method, apparatuses, and non-transitory computer-readable medium described herein may further include operations, features, means, or instructions for determining, based on the repetition parameter, a number of repetitions of the uplink message, and selecting the random access opportunity based on a number of uplink data opportunities in the set of one or more uplink data opportunities associated with the selected random access opportunity and the number of repetitions of the uplink message.

Some examples of the method, apparatuses, and non-transitory computer-readable medium described herein may further include operations, features, means, or instructions for identifying reference signal resources based on the selected random access opportunity, and transmitting, in conjunction with transmission of the one or more repetitions of the uplink message, one or more reference signals using the reference signal resources.

Some examples of the method, apparatuses, and non-transitory computer-readable medium described herein may further include operations, features, means, or instructions for identifying, for each random access opportunity in the set of random access opportunities, an associated frequency hopping pattern, and selecting the random access opportunity based on the associated frequency hopping pattern.

Some examples of the method, apparatuses, and non-transitory computer-readable medium described herein may further include operations, features, means, or instructions for identifying, based on the selected random access opportunity, a frequency hopping pattern for the associated set of one or more uplink data opportunities, transmitting the preamble on the selected random access opportunity over a first frequency resource, and transmitting the one or more repetitions of the uplink message over the first frequency resource and a second frequency resource according to the frequency hopping pattern.

Some examples of the method, apparatuses, and non-transitory computer-readable medium described herein may further include operations, features, means, or instructions for transmitting the preamble over the first frequency resource during a first slot, and transmitting the at least one repetition of the uplink message over the second frequency resource during a second slot.

Some examples of the method, apparatuses, and non-transitory computer-readable medium described herein may further include operations, features, means, or instructions for identifying reference signal resources based on the selected random access opportunity, where the reference signal resources may be the same across the first frequency resource and the second frequency resource.

In some examples of the method, apparatuses, and non-transitory computer-readable medium described herein, the set of one or more uplink data opportunities associated with a random access opportunity may be repeated within an association period of a synchronization signal block (SSB)-random access opportunity (RO)-preamble association or repeat across multiple association periods of the SSB-RO-preamble association, where the association period of the SSB-RO-preamble association may be identified in a remaining minimum system information (RMSI).

In some examples of the method, apparatuses, and non-transitory computer-readable medium described herein, a length of the repetition pattern of the set of one or more uplink data opportunities associated with a random access opportunity may be less than or equal to one association pattern period of the SSB-RO-preamble association identified in the RMSI.

In some examples of the method, apparatuses, and non-transitory computer-readable medium described herein, the repetition pattern of the set of one or more uplink data opportunities associated with a random access opportunity may be repeated across multiple association pattern periods of the SSB-RO-preamble association identified in the RMSI.

Some examples of the method, apparatuses, and non-transitory computer-readable medium described herein may further include operations, features, means, or instructions for determining that the set of random access opportunities include multiple consecutive random access opportunities associated with the same SSB index within an association period, where the number of the multiple consecutive random access opportunities may be at least the number of the one or more repetitions of the uplink message, and transmitting the one or more repetitions of the uplink message within the association period.

Some examples of the method, apparatuses, and non-transitory computer-readable medium described herein may further include operations, features, means, or instructions for determining that the set of random access opportunities include one or more random access opportunities associated with a SSB index within an association period, where a number of the one or more random access opportunities may be less than a number of the one or more repetitions of the uplink message, and transmitting, based on the determining, the one or more repetitions of the uplink message across a set of association periods.

Some examples of the method, apparatuses, and non-transitory computer-readable medium described herein may further include operations, features, means, or instructions for determining that the set of one or more uplink data opportunities associated with the selected random access opportunities includes an unused number of uplink data opportunities that may be less than a threshold number of uplink data opportunities, and refraining from using the unused number of uplink data opportunities.

Some examples of the method, apparatuses, and non-transitory computer-readable medium described herein may further include operations, features, means, or instructions for reallocating the unused number of uplink data opportunities for a non-repetition-based uplink message.

In some examples of the method, apparatuses, and non-transitory computer-readable medium described herein, the configuration signal includes at least one of a synchronization signal, or a system information signal, or a reference signal, or a radio resource control (RRC) signal, or a combination thereof.

A method of wireless communication at a base station is described. The method may include transmitting a configuration signal configuring a set of random access opportunities over which a UE is to transmit a preamble associated with a random access procedure, each random access opportunity associated with a set of one or more uplink data opportunities, receiving, from the UE, the preamble on a selected random access opportunity of the set of random access opportunities, and receiving, from the UE and according to a repetition parameter for an uplink message, one or more repetitions of the uplink message based on the set of one or more uplink data opportunities associated with the selected random access opportunity.

An apparatus for wireless communication at a base station is described. The apparatus may include a processor, memory coupled (e.g., operatively, communicatively, functionally, electronically, or electrically) to the processor, and instructions stored in the memory. The instructions may be executable by the processor to cause the apparatus to transmit a configuration signal configuring a set of random access opportunities over which a UE is to transmit a preamble associated with a random access procedure, each random access opportunity associated with a set of one or more uplink data opportunities, receive, from the UE, the preamble on a selected random access opportunity of the set of random access opportunities, and receive, from the UE and according to a repetition parameter for an uplink message, one or more repetitions of the uplink message based on the set of one or more uplink data opportunities associated with the selected random access opportunity.

Another apparatus for wireless communication at a base station is described. The apparatus may include means for transmitting a configuration signal configuring a set of random access opportunities over which a UE is to transmit a preamble associated with a random access procedure, each random access opportunity associated with a set of one or more uplink data opportunities, receiving, from the UE, the preamble on a selected random access opportunity of the set of random access opportunities, and receiving, from the UE and according to a repetition parameter for an uplink message, one or more repetitions of the uplink message based on the set of one or more uplink data opportunities associated with the selected random access opportunity.

A non-transitory computer-readable medium storing code for wireless communication at a base station is described. The code may include instructions executable by a processor to transmit a configuration signal configuring a set of random access opportunities over which a UE is to transmit a preamble associated with a random access procedure, each random access opportunity associated with a set of one or more uplink data opportunities, receive, from the UE, the preamble on a selected random access opportunity of the set of random access opportunities, and receive, from the UE and according to a repetition parameter for an uplink message, one or more repetitions of the uplink message based on the set of one or more uplink data opportunities associated with the selected random access opportunity.

Some examples of the method, apparatuses, and non-transitory computer-readable medium described herein may further include operations, features, means, or instructions for identifying reference signal resources based on the selected random access opportunity, and receiving, in conjunction with receipt of the one or more repetitions of the uplink message, one or more reference signals using the reference signal resources.

Some examples of the method, apparatuses, and non-transitory computer-readable medium described herein may further include operations, features, means, or instructions for identifying, for each random access opportunity in the set of random access opportunities, an associated frequency hopping pattern, where the selected random access opportunity may be based on the associated frequency hopping pattern.

Some examples of the method, apparatuses, and non-transitory computer-readable medium described herein may further include operations, features, means, or instructions for identifying, based on the selected random access opportunity, a frequency hopping pattern for the associated set of one or more uplink data opportunities, receiving the preamble on the selected random access opportunity over a first frequency resource, and receiving the one or more repetitions of the uplink message over the first frequency resource and a second frequency resource according to the frequency hopping pattern.

Some examples of the method, apparatuses, and non-transitory computer-readable medium described herein may further include operations, features, means, or instructions for receiving the preamble over the first frequency resource during a first slot, and receiving at least one repetition of the uplink message over the second frequency resource during a second slot.

Some examples of the method, apparatuses, and non-transitory computer-readable medium described herein may further include operations, features, means, or instructions for identifying reference signal resources based on the selected random access opportunity, where the reference signal resources may be the same across the first frequency resource and the second frequency resource.

In some examples of the method, apparatuses, and non-transitory computer-readable medium described herein, the set of one or more uplink data opportunities associated with a random access opportunity may be repeated within an association period of a SSB-RO-preamble association or repeat across multiple association periods of the SSB-RO-preamble association, where the association period of the SSB-RO-preamble association may be identified in a RMSI.

In some examples of the method, apparatuses, and non-transitory computer-readable medium described herein, a length of the repetition pattern of the set of one or more uplink data opportunities associated with a random access opportunity may be less than or equal to one association pattern period of the SSB-RO-preamble association identified in the RMSI.

In some examples of the method, apparatuses, and non-transitory computer-readable medium described herein, the repetition pattern of the set of one or more uplink data opportunities associated with a random access opportunity may be repeated across multiple association pattern periods of the SSB-RO-preamble association identified in the RMSI.

Some examples of the method, apparatuses, and non-transitory computer-readable medium described herein may further include operations, features, means, or instructions for determining that the set of random access opportunities include multiple consecutive random access opportunities associated with the same synchronization signal block (SSB) index within an association period, where the number of the multiple consecutive random access opportunities may be at least the number of the one or more repetitions of the uplink message, and receiving, based on the determining, the one or more repetitions of the uplink message within the association period.

Some examples of the method, apparatuses, and non-transitory computer-readable medium described herein may further include operations, features, means, or instructions for determining that the set of random access opportunities include one or more random access opportunities associated with a SSB index within an association period, where a number of the one or more random access opportunities may be less than a number of the one or more repetitions of the uplink message, and receiving, based on the determining, the one or more repetitions of the uplink message across a set of association periods.

Some examples of the method, apparatuses, and non-transitory computer-readable medium described herein may further include operations, features, means, or instructions for determining that the set of one or more uplink data opportunities associated with the selected random access opportunities include an unused number of uplink data opportunities that cannot guarantee a preferred number of uplink data opportunities, and refraining from receiving the uplink message on the unused number of uplink data opportunities.

Some examples of the method, apparatuses, and non-transitory computer-readable medium described herein may further include operations, features, means, or instructions for reallocating the unused number of uplink data opportunities for a non-repetition-based uplink message.

In some examples of the method, apparatuses, and non-transitory computer-readable medium described herein, the configuration signal includes at least one of a synchronization signal, or a system information signal, or a reference signal, or a RRC signal, or a combination thereof.

DETAILED DESCRIPTION

Figure 1:
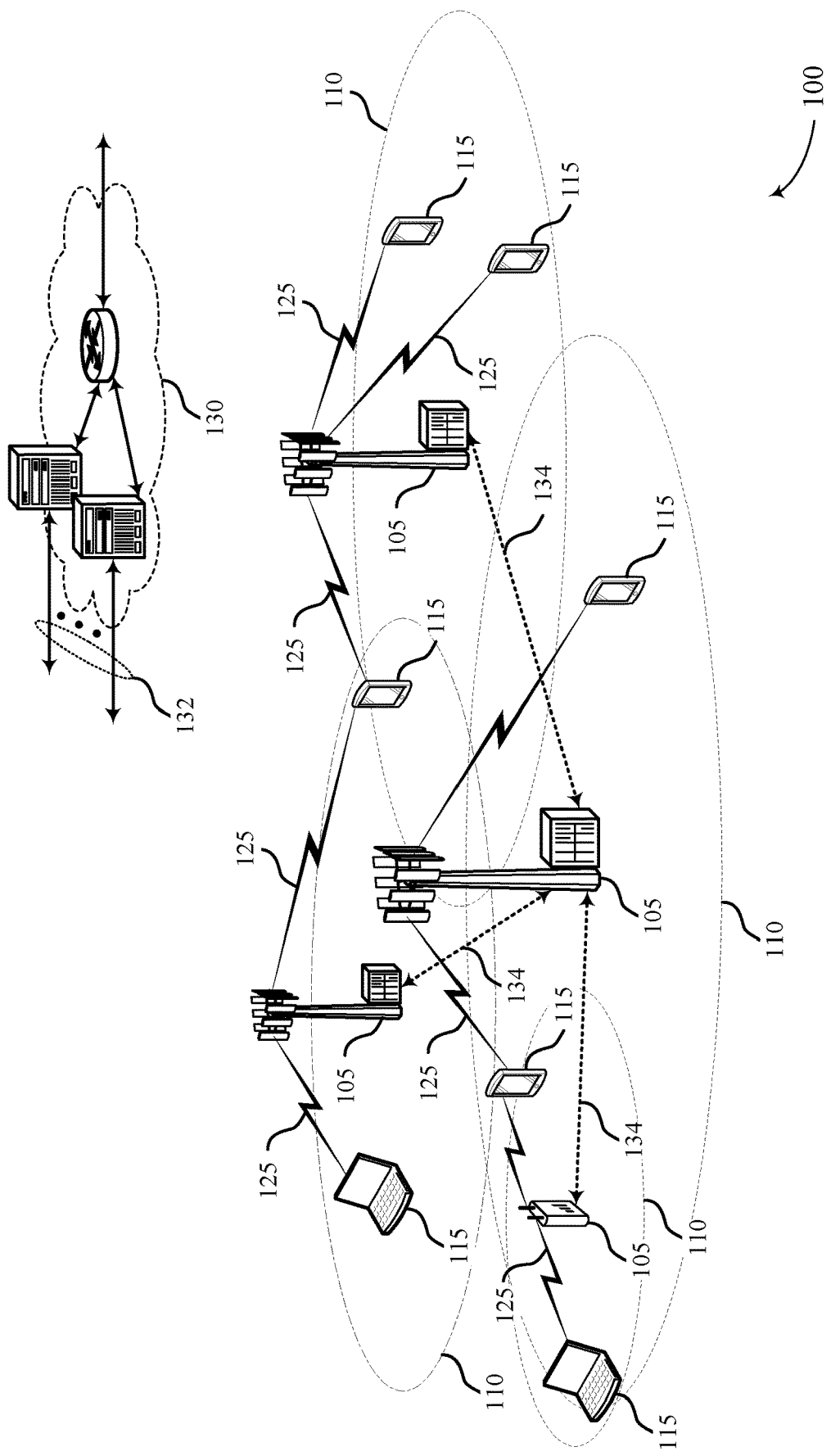
FIG. 1 illustrates an example of a system for wireless communications that supports efficient New Radio (NR)-Light message A repetition in two-step random access channel (RACH) procedure in accordance with aspects of the present disclosure.

Some wireless communication systems may be configured to support communications with reduced capability user equipment (UE). For example, a New Radio (NR)-Light wireless network may support communications with a UE using a reduced transmit power level, over a reduced bandwidth, using fewer antennas, having reduced computational complexity, and the like. Examples of such UE include, but are not limited to, smart wearables devices, industrial sensors, video surveillance devices, and the like. This approach may be helpful for such reduced capability UE requiring less complex/resource intensive communication protocols, but may have its own associated concerns. For example, communications using a reduced transmit power level, smaller bandwidth, etc., may mean that there is a corresponding increase in the number of failed communication attempts. To address this, such reduced capability UE may rely on repetition of its uplink transmissions to overcome such losses and improve reliability. However, such wireless communication systems scheduling repetition for uplink transmissions for a reduced capability UE typically are rigid and result in waste and/or inefficient resource use.

Aspects of the disclosure are initially described in the context of a wireless communication system. Generally, the described techniques provide for improving repetition of uplink messages for reduced capability UE. That is, some UE may be configured, or otherwise support, to perform uplink transmissions using a reduced transmit power level, a lower bandwidth, a reduced or limited number of antennas, a reduced computational complexity, and the like. Accordingly, uplink repetition may be used to recover from the loss due to fewer antennas, lower transmit power level, etc. For example, the base station may configure the UE (e.g., using a configuration signal) with a set of random access opportunities, with each random access opportunity having an associated set of one or more uplink data opportunities. Broadly, the random access opportunity may be used by the UE for transmitting a preamble (e.g., a random access channel (RACH) message A) during a RACH procedure. The random access opportunity may also be referred to as a RACH occasion, a physical random access channel (PRACH) occasion, and the like. The UE may identify or otherwise determine a repetition parameter for an uplink message (e.g., the number of repetitions to be used for the uplink message), and select one of the random access opportunities based on the repetition parameter. For example, the UE may select a particular random access opportunity due to the associated uplink data opportunities having the same or more uplink data opportunities as the number of repetitions to be used for the uplink message. Accordingly, the UE may transmit the preamble to the base station on the selected random access opportunity and transmit the one or more repetitions of the uplink message using the one or more uplink data opportunities associated with the selected random access opportunity.

Aspects of the disclosure are further illustrated by and described with reference to apparatus diagrams, system diagrams, and flowcharts that relate to efficient NR-Light message A repetition in two-step RACH procedure.

FIG. 1 illustrates an example of a wireless communication system 100 that supports efficient NR-Light message A repetition in two-step RACH procedure in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, a NR-Light network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of a RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or a base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may receive a configuration signal configuring a set of random access opportunities over which to transmit a preamble associated with a random access procedure, each random access opportunity associated with a set of one or more uplink data opportunities. The UE 115 may identify a repetition parameter for an uplink message. The UE 115 may select a random access opportunity from the set of configured random access opportunities for transmitting the preamble based at least in part on the repetition parameter. The UE 115 may transmit the preamble on the selected random access opportunity. The UE 115 may transmit one or more repetitions of the uplink message based at least in part on the set of one or more uplink data opportunities associated with the selected random access opportunity.

A base station 105 may transmit a configuration signal configuring a set of random access opportunities over which a UE 115 is to transmit a preamble associated with a random access procedure, each random access opportunity associated with a set of one or more uplink data opportunities. The base station 105 may receive, from the UE 115, the preamble on a selected random access opportunity of the set of random access opportunities. The base station 105 may receive, from the UE 115 and according to a repetition parameter for an uplink message, one or more repetitions of the uplink message based at least in part on the set of one or more uplink data opportunities associated with the selected random access opportunity.

Figure 2:
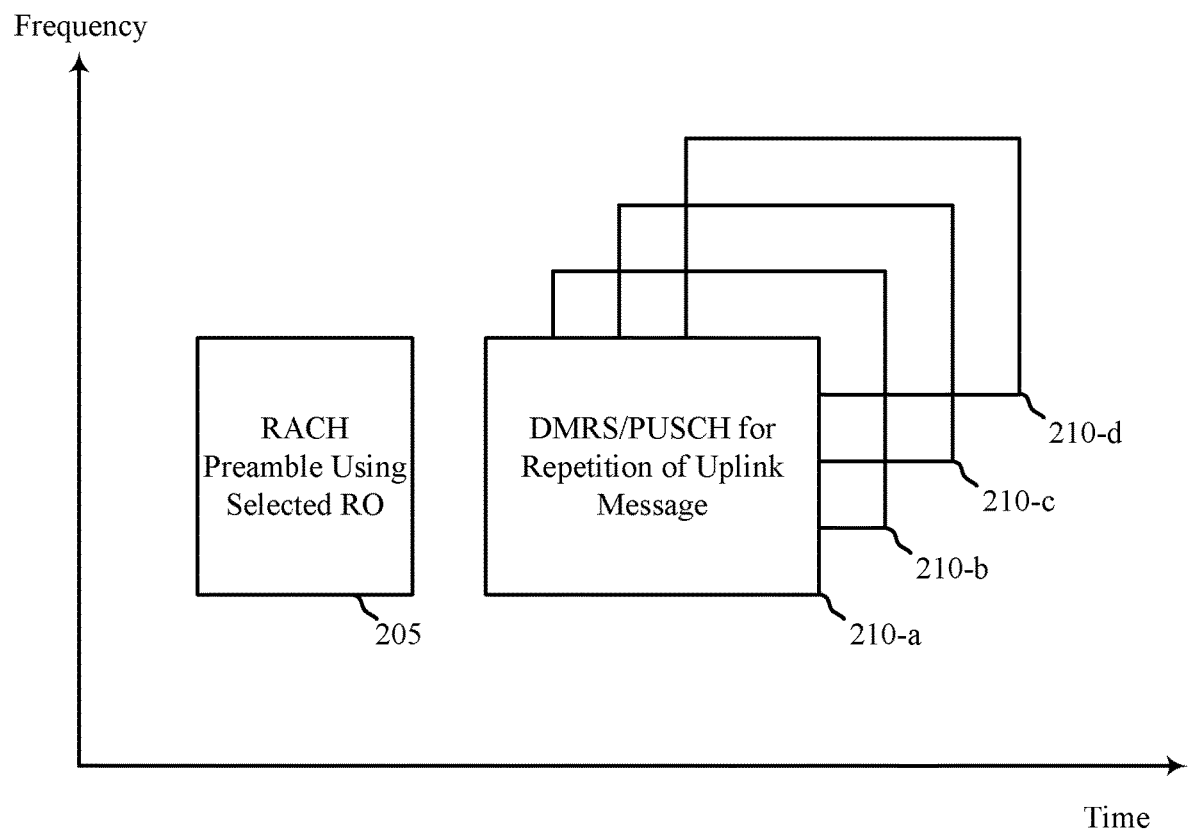
FIG. 2 illustrates an example of a RACH configuration that supports efficient NR-Light message A repetition in two-step RACH procedure in accordance with aspects of the present disclosure.

FIG. 2 illustrates an example of a RACH configuration 200 that supports efficient NR-Light message A repetition in two-step RACH procedure in accordance with aspects of the present disclosure. In some examples, RACH configuration 200 may implement aspects of wireless communication system 100. Aspects of a RACH configuration 200 may be implemented by a base station and/or UE, which may be examples of the corresponding devices described herein.

Wireless communication systems, such as a NR-Light network, may support communications by a reduced capability or low-tier UE, such as smart wearable devices, industrial sensors, video surveillance devices, IoT devices, vehicle-based devices, and the like. These devices may be considered a reduced capability UE in that they support a reduced transmit power level (e.g., the uplink transmit power level may be as much as 10 dB less than other UE), have fewer antennas (e.g., may only be equipped with a single transmit antenna), have a reduced transmit/receive bandwidth (e.g., 5 to 20 MHz bandwidth for both transmit and receive, in some examples), have a reduced number of receive antennas (e.g., may only have a single receive antenna, which may be associated with a lower equivalent receive signal-to-noise ratio (SNR)), have a reduced computational complexity, and the like. Repetitions in downlink and/or uplink communications may be supported for such reduced capability UE. For example, repetitions in downlink transmissions may be provided to compensate for a reduced number of receive antennas. Similarly, repetitions in uplink communications may be used to recover from the loss due to the reduced number of transmit antennas, limited transmit power levels, and the like.

Reduced capability UE (as well as other UE) connect to a base station (e.g. initially or due to mobility) using either a 4-step RACH procedure or a 2-step RACH procedure. For example, the UE may initially synchronize with downlink timing of the base station during a cell search. The 4-step RACH procedure may include the UE transmitting a random access preamble (message 1 (msg1)) to the base station, which responds by transmitting a random access response (message 2 (msg2)) to the UE. The UE then transmits device identification information (message 3 (msg3)) to the base station, which responds with contention resolution information (message 4 (msg4)). The 2-step RACH procedure includes the UE transmitting, in step one, a RACH preamble along with reference signals, data, and the UE identification information in the RACH message A (msgA). The base station responds by transmitting a response message and contention resolution information in the RACH message B (msgB). After the RACH procedure, the UE and base station exchange data over the connection.

More particularly with reference to the 2-step RACH procedure, the UE (e.g., the reduced capability UE) may receive a synchronization signal block (SSB), system information block (SIB), and reference signal(s) from the base station, and use this information for downlink synchronization, system information decoding and measurements. In step one, the UE may transmit the preamble (e.g., msgA RACH preamble) and then transmit the uplink message (e.g., msgA data payload) to the base station. For example, the UE may select a msgA preamble occasion (e.g., a RACH occasion (R0)) and a preamble sequence for the preamble transmission. The UE may, after a guard time and/or transmitting gap, transmit using one or more of demodulation reference signal (DMRS) and physical uplink shared channel (PUSCH) occasions to transmit the uplink message. To support frequency hopping, a virtual resource block-to-physical resource block mapping, repetition of msgA, etc., the UE can select multiple uplink data opportunities. The uplink data opportunities may include multiple DMRS sequences/antenna ports and corresponding PUSCH occasions (e.g., which may be referred to as a PUSCH occasion or simply PO). In step 2, the base station may detect and process the msgA preamble and corresponding msgA payload. The base station may then transmit a control signal (e.g., msgB PDCCH) and corresponding data payload (e.g., msgB PDSCH) to the UE to complete the RACH procedure.

In some aspects, a remaining minimum system information (RMSI) may carry or otherwise convey information linking a RO with SSB information (e.g., RO-SSB-Associations). For example, the physical random access channel (PRACH) parameters may be determined based on parameters carried in SIB1. As one non-limiting example, RACH preambles may include up to 64 preambles, which are determined by parameters such as prach-RootSequenceIndex, restrictedSetConfig, zeroCorrelationZoneConfig, totalNumberOfRA-Preambles, etc. When the UE can transmit the RACH preamble, and what preamble format the UE can transmit, may be determined by the parameter prach-ConfigurationIndex, which may indicate the number of FDM'd ROs at each RO (e.g., as determined by msg1-FDM), the starting frequency of the RO(s) (e.g., as determined by msg1FrequencyStart), and the like. The SSB-index vs. RO (e.g., how a transmitted RACH preamble and/or a chosen RO can be associated with an SSB index for, as one non-limiting example, beam management) may be determined by the parameter ssb-perRACH-OccasionAndCB-PreamblesPerSSB. That is, the ssb-perRACH-OccasionAndCB-PreamblesPerSSB may have a twofold meaning (e.g., a 2-D matrix with some invalid/valid entries) by: SSB-per-rach-occasion (e.g., ⅛, ¼, ½, 1, 2, 4, 8, 16, etc.), CB-preambles-per-SSB (e.g., {4, 8, 12, . . . , 64} for SSB-per-rach-occasion={⅛, ¼, ½, 1}; {4, 8, 12, . . . , 32} for SSB-per-rach-occasion=2; {1, 2, 3, . . . , 16} for SSB-per-rach-occasion={4}, {1, 2, . . . , 8} for SSB-per-rach-occasion={8}; {1, 2, 3, 4} for SSB-per-rach-occasion={16}. In some aspects, the totalNumberOfRA-Preambles should be equal to CB-preambles-per-SSB*max(1, SSB-per-rach-occasion). This mapping may follow for sequentially increasing orders: <1> preamble indexes within a single RO; <2> FDM index for the same time-domain RO instance; <3> TDM RO index within a PRACH slot; and <4> PRACH slot index.

Some wireless communication systems may define an association period and an association period pattern. An association period, starting from frame 0, for mapping SS/PBCH blocks to PRACH occasions is the smallest value in the set determined by the PRACH configuration period according to Table 1 below, such that N SSB blocks are mapped at least once to the PRACH occasions within the association period, where a UE obtains the value of N from RMSI. In some aspects, The RO location pattern given by prach-ConfigurationIndex repeats every RACH Configuration Period. If after an integer number of SS/PBCH blocks to PRACH occasions mapping cycles within the SSB-RO association period there is a set of PRACH occasions that are not mapped to N SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

TABLE 1

| PRACH Configuration Period (msec) | Association Period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

Some wireless communication systems may support an agreement that validation of the RO and PO are jointly considered. As discussed, repetition of PUSCH may be necessary to compensate for the coverage loss associated with reduced capability UE. Some approaches to resolve this may map a certain RO with multiple groups of POs by partitioning the preamble sequences associated with the RO, wherein different groups of POs are associated with different repetition levels. However, this approach may be inefficient, for example, when considering the number of reduced capability UEs may be small, such that the reserved POs with respect to high repetition levels may be wasted. This may be especially wasteful if the POs associated with different repetition levels are orthogonally configured.

Accordingly, aspects of the described techniques support more efficient resource utilization to enable different repetition levels for uplink message repetition (such as msgA repetition during a RACH procedure). In particular, POs are not specifically separated for different repetition levels, while enhancements on preamble sequences/DMRS designs are used to enable the repetitions of PUSCH (e.g., the uplink message).

In some examples, aspects the described techniques provide for repetition of POs following a RO. For consecutive ROs associated with the same SSB-index, there may be an assumption that there is at least one PO associated with each RO. For UEs preferring repetition of the uplink message (e.g., PUSCH repetitions), the UE may transmit the RACH preamble in a chosen RO, e.g., using one RACH preamble from a group of NR-Light dedicated preamble sequences. The UE may repeat PUSCHs using a number of POs associated with a following number of ROs. The DMRS may be chosen based on the RO-index of the chosen RO, e.g., from the set of NR-light dedicated DMRS resources.

For UEs not preferring repetitions, these UE may transmit the RACH preamble in any RO using one preamble from a group of preambles dedicated for non-repetition UEs. These UEs may transmit PUSCH in the PO associated with the RO. A default DMRS that is different from the DMRSs in the set of NR-Light dedicated DMRS resources may be used.

In this example, the UEs preferring repetitions may transmit the NR-light dedicated preambles in a subset of ROs, wherein the subset of ROs may be a fixed RO index between two adjacent ROs within the subset. In some aspects, different ROs may also be associated with different repetition levels, which may be configured by the base station (e.g., via RMSI). This may provide more preamble resources in the ROs for the UEs not preferring repetitions. That is, this may provide a resource balance between repetition UEs and non-repetition UEs.

Accordingly, the base station may transmit or otherwise provide a configuration signal to the UE that configures a set of random access opportunities 205 (e.g., ROs) over which the UE can transmit a RACH preamble during a RACH procedure. The configuration signal may include a synchronization signal, system information signal (e.g., RMSI), a reference signal, a RRC signal, and the like, alone or in any combination. In some aspects, each random access opportunity 205 in the set of random access opportunities 205 configured for the UE may have an associated set of one or more uplink data opportunities 210 (e.g., POs). The UE may identify or otherwise determine a repetition parameter for an uplink message (e.g., PUSCH, RACH msgA payload, and the like), which may generally refer to the number of repetitions of the uplink message that the UE wants to send. Based on the repetition parameter, the UE may select at least one random access opportunity 205 from the set of configured random access opportunities 205 to transmit the RACH preamble. For example, the UE may select a random access opportunity 205 based on the number of uplink data opportunities 210 associated with that random access opportunity 205. That is, the UE may ensure that the number of uplink data opportunities 210 associated with that random access opportunity 205 satisfies the repetition parameter identified for the uplink message. Accordingly, the UE may transmit the preamble (e.g., the RACH preamble) on the selected random access opportunity 205, and then transmit one or more repetitions of the uplink message in the uplink data opportunities 210 associated with the selected random access opportunity 205. In the example RACH configuration 200, this includes the UE transmitting four repetitions of the uplink message in uplink data opportunities 210-a, 210-b, 210-c, and 210-d. However, it is to be understood that aspects of the described techniques are not limited to four repetitions, but may include any number of repetitions of the uplink data opportunities 210.

In some aspects, reference signal resources (e.g., DMRS) for the corresponding repetitions of the uplink message may be based on the selected random access opportunity 205. That is, the UE may identify the reference signal resources based on which random access opportunity 205 is selected, and then transmit reference signals in conjunction with the one or more repetitions of the uplink message according to the identified reference signals resources.

In some aspects, the one or more uplink data opportunities 210 may be repeated within an association period or repeated across multiple association periods. For example, the UE may determine that the set of random access opportunities 205 include multiple consecutive random access opportunities 205 associated with the same SSB index within an association period, with the number of the multiple consecutive random access opportunities 205 being at least the number of the one or more repetitions of the uplink message. Accordingly, the UE may transmit the one or more repetitions of the uplink message using the uplink data opportunities 210 within the association period.

As another example, the UE may determine that the set of random access opportunities 205 include one or more random access opportunities 205 with a SSB index within an association period, with the number of the random access opportunities 205 being less than the number of the repetitions of the uplink message. Accordingly, the UE may transmit the one or more repetitions of the uplink message across a plurality of association periods.

In some aspects, the UE may determine that the set of one or more uplink data opportunities 210 associated with the selected random access opportunity 205 includes an unused number of uplink data opportunities 210 that is less than a threshold number of uplink data opportunities 210. In this context, the UE may refrain from using the unused number of uplink data opportunities 210 and, instead, reallocate those unused uplink data opportunities 210 for a non-repetition-based uplink message transmission.

That is and with reference to the repetition period, some aspects may include the mapping period being determined based on different cases. In case 1, if there are multiple consecutive ROs (e.g., random access opportunities 205) associated with the same SSB index within a single association period, the mappings described herein may include at least one cycle within one association period. Broadly, a cycle of the mapping as discussed herein may include all DMRS resources dedicated for the UEs preferring repetitions being used at least one time with a full number of preferred repetitions. In case 2, if there is only one RO associated with the same SSB index within a single association period, the mappings described herein may include one cycle across multiple association periods. In case 3, the mapping's described herein may repeat across multiple association pattern periods. In case 4, such repetition period may be no more than the association pattern period.

If, after an integer number of the proposed mapping cycles, there are still POs (e.g., uplink data opportunities 210) left that cannot guarantee a preferred number of PUSCH repetitions, such POs may not be used for the mappings of PUSCH repetitions described herein. Such POs may still be used for non-repetition PUSCHs.

Figure 3:
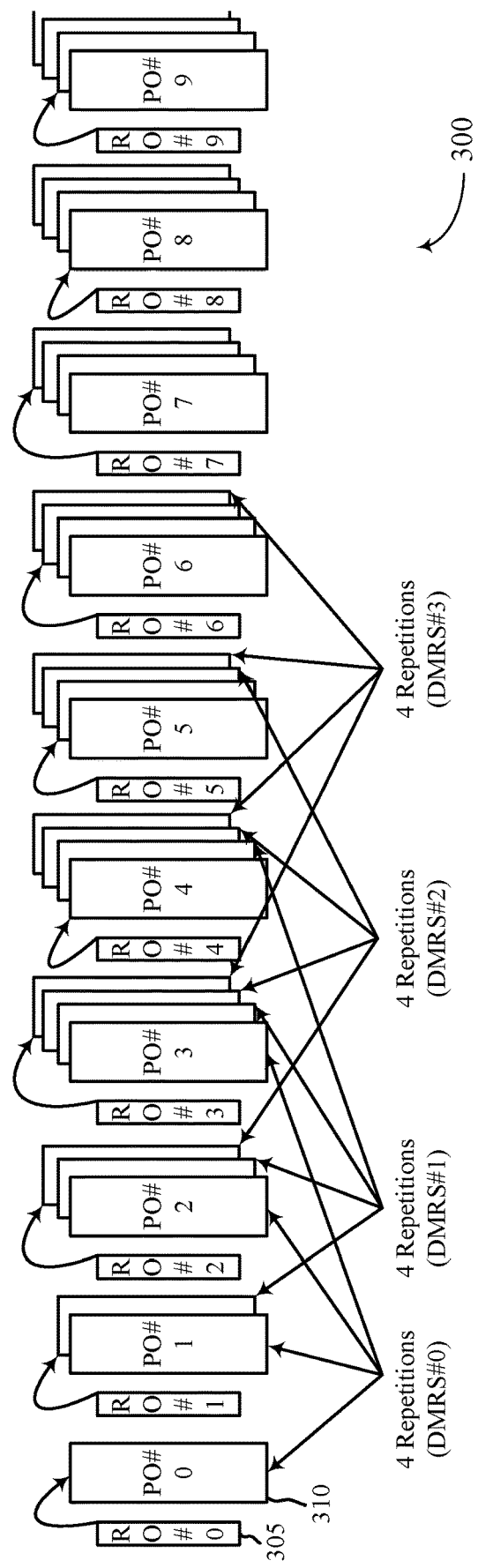
FIG. 3 illustrates an example of a RACH configuration that supports efficient NR-Light message A repetition in two-step RACH procedure in accordance with aspects of the present disclosure.

FIG. 3 illustrates an example of a RACH configuration 300 that supports efficient NR-Light message A repetition in two-step RACH procedure in accordance with aspects of the present disclosure. In some examples, RACH configuration 300 may implement aspects of wireless communication system 100 and/or RACH configuration 200. Aspects of RACH configuration 300 may be implemented by a base station and/or UE, which may be examples of the corresponding devices described herein.

As discussed above, the base station may configure the UE with a set of random access opportunities 305 (e.g., ROs, with only one RO being labeled for ease of reference) for the UE to use for transmission of a preamble message during a RACH procedure. Generally, each random access opportunity 305 may correspond to, or otherwise be associated with, a set of one or more uplink data opportunities 310 (e.g., POs, with only one PO being labeled for ease of reference). For example, the base station may configure the UE using a configuration signal, such as an RMSI, a synchronization signal, a SIB, a RRC, and the like. The UE, having a multi-repetition uplink message for transmission, may determine the repetition parameter for the uplink message (e.g., the number of repetitions of the uplink message that the UE prefers to transmit). Broadly, the uplink message may include any sort of information being transmitted from the UE to the base station, e.g., PUSCH, RACH messages, and the like. In one example, the uplink message may include a msgA of a two-step RACH procedure.

The UE may identify or otherwise determine the repetition parameter for the uplink message, e.g., the number of repetitions of the uplink message the UE wishes to transmit. Accordingly, the UE may select one random access opportunity 305 from the set of configured random access opportunities 305 for transmitting the preamble based on the repetition parameter. That is, the UE may determine the number repetitions of the uplink message and select the random access opportunity 305 based on that random access opportunity 305 having a number of associated uplink data opportunities 310 that satisfies the repetition parameter. For example, if the repetition parameter indicates that four repetitions of the uplink message are to be transmitted, the UE may select a random access opportunity 305 having an associated set of at least four uplink data opportunities 310.

As discussed, in some aspects the DMRS transmitted in conjunction with the transmission of the one or more repetitions of the uplink message may be based on the selected random access opportunity 305. That is, the UE may select RO #0 (e.g., the first random access opportunity 305) with a corresponding DMRS index of #0. Accordingly, the UE may transmit the preamble during RO #0 and then transmit the one or more repetitions of the uplink message in the associated uplink data opportunities 310 corresponding to RO #0/DMRS #0. This may include the UE transmitting one repetition of the uplink message in PO #0, a second repetition of the uplink message in PO #1, a third repetition of the uplink message in PO #2, and the fourth repetition of the uplink message in PO #3.

Alternatively, the UE may select RO #1 (e.g., the second random access opportunity 305) with a corresponding DMRS index of #1. Accordingly, the UE may transmit the preamble during RO #1 and then transmit the one or more repetitions of the uplink message in the associated uplink data opportunities 310 corresponding to DMRS #1. This may include the UE transmitting one repetition of the uplink message in the PO corresponding to RO #1 (as illustrated by the arrow between RO #1 and the PO behind the PO labeled as PO #1), a second repetition of the uplink message in PO behind the PO labeled as PO #2, a third repetition of the uplink message in the PO behind the PO labeled as PO #3, and the fourth repetition of the uplink message in the PO behind the PO labeled as PO #4. That is, the one or more uplink data opportunities 310 associated with RO #1 are shown as the second row of POs in the stack of POs shown in RACH configuration 300.

This pattern may repeat for RO #2 and the POs associated with DMRS #2, and again for RO #3 and the POs associated with DMRS #3. That is, the one or more uplink data opportunities 310 associated with RO #2 are shown as the third row of POs in the stack of POs shown in RACH configuration 300. Similarly, the one or more uplink data opportunities 310 associated with RO #3 are shown as the fourth row of POs in the stack of POs shown in RACH configuration 300.

Accordingly, the set of configured random access opportunities 305 (e.g., RO #0 through RO #9) may be configured for the UE, with each random access opportunity having an associated set of one or more (with four being shown by way of non-limiting example only) uplink data opportunities 310 (e.g., POs). In some aspects, the POs (e.g., the one or more uplink data opportunities 310) may be associated with, or otherwise configured for, NR-Light dedicated preambles. Although not shown in RACH configuration 300, it is to be understood that non-repetition UEs can choose an arbitrary RO and PO for a non-repetition-based uplink transmission, e.g., by using a preamble and a DMRS resource from a non-repetition-specific preamble group and a non-repetition-specific DMRS resource pool.

Figure 4:
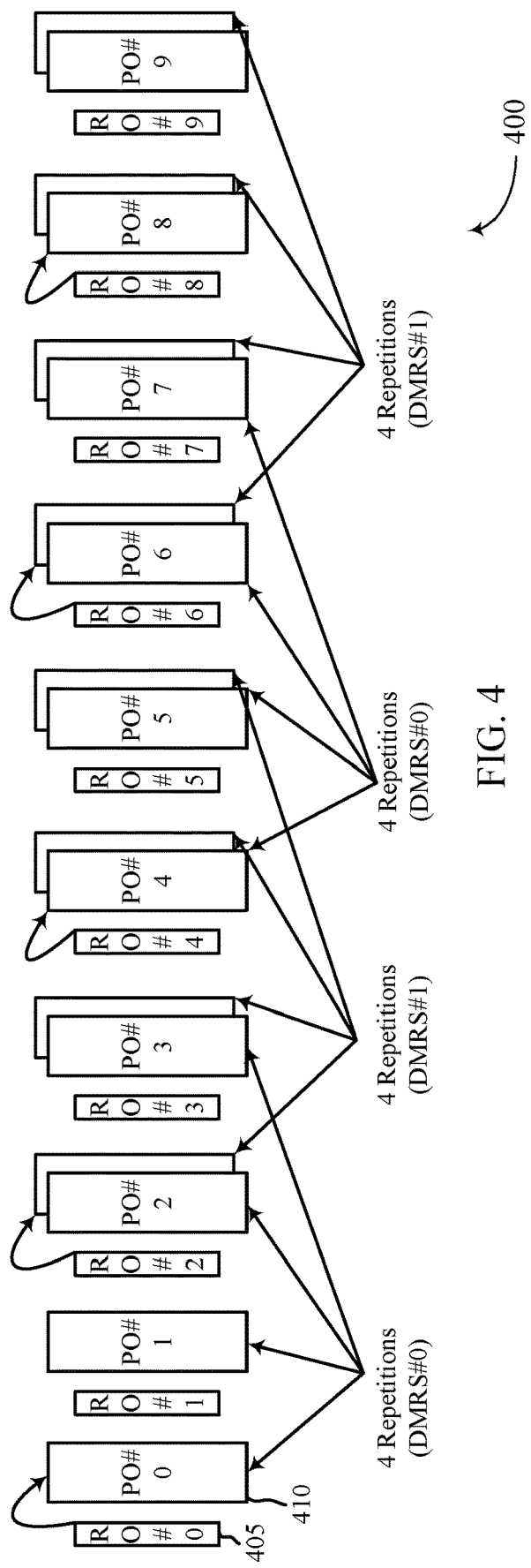
FIG. 4 illustrates an example of a RACH configuration that supports efficient NR-Light message A repetition in two-step RACH procedure in accordance with aspects of the present disclosure.

FIG. 4 illustrates an example of a RACH configuration 400 that supports efficient NR-Light message A repetition in two-step RACH procedure in accordance with aspects of the present disclosure. In some examples, RACH configuration 400 may implement aspects of wireless communication system 100 and/or RACH configurations 200 and/or 300. Aspects of RACH configuration 400 may be implemented by a base station and/or UE, which may be examples of the corresponding devices described herein.

As discussed above, the base station may configure the UE with a set of random access opportunities 405 (e.g., ROs, with only one RO being labeled for ease of reference) for the UE to use for transmission of a preamble message during a RACH procedure. Generally, each random access opportunity 405 may correspond to, or otherwise be associated with, a set of one or more uplink data opportunities 410 (e.g., POs, with only one PO being labeled for ease of reference). For example, the base station may configure the UE using a configuration signal, such as an RMSI, a synchronization signal, a SIB, a RRC, and the like. The UE, having a multi-repetition uplink message for transmission, may determine the repetition parameter for the uplink message (e.g., the number of repetitions of the uplink message that the UE prefers to transmit). Broadly, the uplink message may include any sort of information being transmitted from the UE to the base station, e.g., PUSCH, RACH messages, and the like. In one example, the uplink message may include a msgA of a two-step RACH procedure.

The UE may identify or otherwise determine the repetition parameter for the uplink message, e.g., the number of repetitions of the uplink message the UE wishes to transmit. Accordingly, the UE may select one random access opportunity 405 from the set of configured random access opportunities 405 for transmitting the preamble based on the repetition parameter. That is, the UE may determine the number repetitions of the uplink message and select the random access opportunity 405 based on that random access opportunity 405 having a number of associated uplink data opportunities 410 that satisfies the repetition parameter. For example, if the repetition parameter indicates that four repetitions of the uplink message are to be transmitted, the UE may select a random access opportunity 405 having an associated set of at least four uplink data opportunities 410. If the repetition parameter indicates that three repetitions of the uplink message are to be transmitted, the UE may select a random access opportunity 405 having an associated set of at least three uplink data opportunities 410.

RACH configuration 400 illustrates an example where the NR-Light dedicated preambles are in a subset of ROs, with the subset of ROs including a fixed RO index offset between two adjacent ROs within the subset. Different ROs may be associated with different repetition levels, which may be configured by the base station (e.g., via RMSI). In the example illustrated in RACH configuration 400, the subset of ROs may include RO #0, RO #2, RO #4, RO #6, and RO #8, although the described techniques are not limited to every other RO. For example, the subset of ROs configured for the UE may include RO #0, RO #3, RO #6, and RO #9, or any other pattern of ROs.

As discussed, in some aspects the DMRS transmitted in conjunction with the transmission of the one or more repetitions of the uplink message may be based on the selected random access opportunity 405. That is, the UE may select RO #0 (e.g., the first random access opportunity 405) with a corresponding DMRS index of #0. Accordingly, the UE may transmit the preamble during RO #0 and then transmit the one or more repetitions of the uplink message in the associated uplink data opportunities 410 corresponding to RO #0/DMRS #0. This may include the UE transmitting one repetition of the uplink message in PO #0, a second repetition of the uplink message in PO #1, a third repetition of the uplink message in PO #2, and the fourth repetition of the uplink message in PO #3.

Alternatively, the UE may select RO #2 (e.g., the third random access opportunity 405) with a corresponding DMRS index of #1. Accordingly, the UE may transmit the preamble during RO #2 and then transmit the one or more repetitions of the uplink message in the associated uplink data opportunities 410 corresponding to DMRS #1. This may include the UE transmitting one repetition of the uplink message in the PO corresponding to RO #2 (as illustrated by the arrow between RO #2 and the PO behind the PO labeled as PO #2), a second repetition of the uplink message in PO behind the PO labeled as PO #3, a third repetition of the uplink message in the PO behind the PO labeled as PO #4, and the fourth repetition of the uplink message in the PO behind the PO labeled as PO #5. That is, the one or more uplink data opportunities 410 associated with RO #2 are shown as the second row of POs in the stack of POs shown in RACH configuration 400.

This pattern may start over (e.g., within the same association period) at RO #4 and the POs associated with DMRS #0, and again for RO #6 and the POs associated with DMRS #1. That is, the one or more uplink data opportunities 410 associated with RO #4 start again in the first row of POs in the stack of POs shown in RACH configuration 400. Similarly, the one or more uplink data opportunities 410 associated with RO #6 start again in the second row of POs in the stack of POs shown in RACH configuration 400.

Accordingly, the set of configured random access opportunities 405 (e.g., RO #0, through RO #9, with the subset including RO #0, RO #2, RO #4, RO #6, and RO #8) may be configured for the UE, with each random access opportunity 405 having an associated set of one or more (with four being shown by way of non-limiting example only) uplink data opportunities 410 (e.g., POs). In some aspects, the POs (e.g., the one or more uplink data opportunities 410) may be associated with, or otherwise configured for, NR-Light dedicated preambles. Although not shown in RACH configuration 400, it is to be understood that there may be other POs configured for the UE (or other UEs) that are associated with non-repetition-based uplink message transmissions. For example, these other POs may be associated with DMRS #3 (not shown) and used for PUSCH transmissions without repetition.

Figure 5:
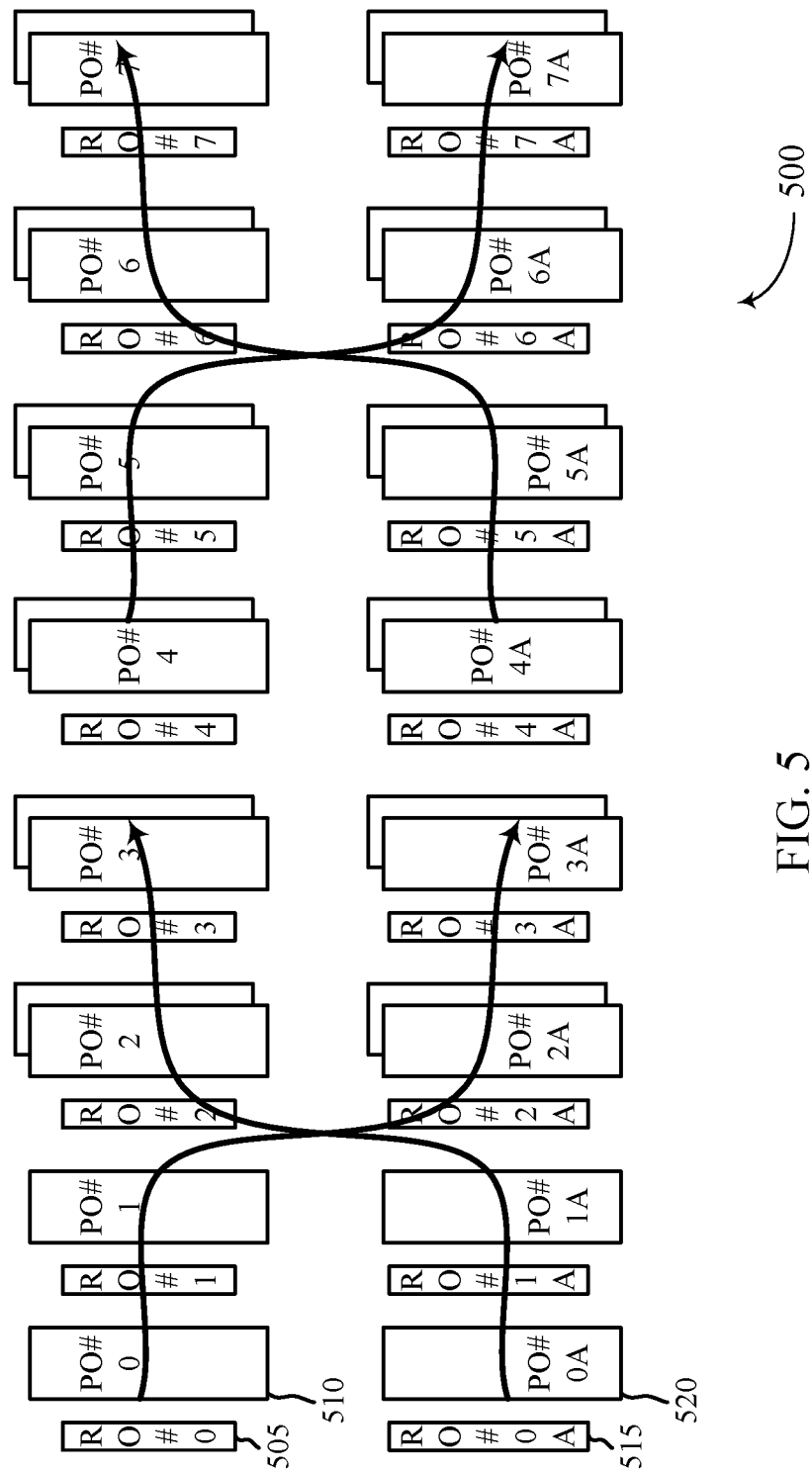
FIG. 5 illustrates an example of a RACH configuration that supports efficient NR-Light message A repetition in two-step RACH procedure in accordance with aspects of the present disclosure.

FIG. 5 illustrates an example of a RACH configuration 500 that supports efficient NR-Light message A repetition in two-step RACH procedure in accordance with aspects of the present disclosure. In some examples, RACH configuration 500 may implement aspects of wireless communication system 100 and/or RACH configurations 200, 300, and/or 400. Aspects of RACH configuration 500 may be implemented by a base station and/or UE, which may be examples of the corresponding devices described herein.

Broadly, RACH configuration 500 illustrates an example where the RO and PO are FDM'd and inter-slot PO frequency hopping is supported. For example, assuming that there are multiple FDM'd ROs at each RO instance and there are also corresponding FDM'd POs associated with such FDM'd ROs, a UE preferring repetitions may utilize a frequency hopping pattern by changing the PO's FDM index between repetitions. The frequency hopping pattern may be associated with the selected random access opportunity 505 (e.g., RO) to transmit the NR-Light dedicated preamble. The DMRS resource may remain the same, although the PO frequency is hopped among repetitions.

As discussed above, the base station may configure the UE with a set of random access opportunities (e.g., RO) for the UE to use for transmission of a preamble message during a RACH procedure. In this example, the set of random access opportunities may include random access opportunities 505 configured for the UE on a first frequency resource (e.g., carrier, frequency band, etc.) and random access opportunity 515 configured for the UE on a second frequency resource (e.g., carrier, frequency band, etc.). Generally, each random access opportunity 505/515 may correspond to, or otherwise be associated with, a set of one or more uplink data opportunities 510/520 (e.g., POs). For example, the base station may configure the UE using a configuration signal, such as an RMSI, a synchronization signal, a SIB, a RRC, and the like. The UE, having a multi-repetition uplink message for transmission, may determine the repetition parameter for the uplink message (e.g., the number of repetitions of the uplink message that the UE prefers to transmit). Broadly, the uplink message may include any sort of information being transmitted from the UE to the base station, e.g., PUSCH, RACH messages, and the like. In one example, the uplink message may include a msgA of a two-step RACH procedure.

The UE may identify or otherwise determine the repetition parameter for the uplink message, e.g., the number of repetitions of the uplink message the UE wishes to transmit. Accordingly, the UE may select one random access opportunity 505/515 from the set of configured random access opportunities for transmitting the preamble based on the repetition parameter. That is, the UE may determine the number repetitions of the uplink message and select the random access opportunity based on that random access opportunity having a number of associated uplink data opportunities that satisfies the repetition parameter. For example, if the repetition parameter indicates that four repetitions of the uplink message are to be transmitted, the UE may select a random access opportunity having an associated set of at least four uplink data opportunities. If the repetition parameter indicates that three repetitions of the uplink message are to be transmitted, the UE may select a random access opportunity having an associated set of at least three uplink data opportunities.

RACH configuration 500 illustrates an example where the NR-Light dedicated preambles are in different frequency resources. Different ROs may be associated with different repetition levels, which may be configured by the base station (e.g., via RMSI). In the example illustrated in RACH configuration 500, a subset of ROs may include RO #0 through RO #7 configured on the first frequency resource and RO #0A through ROTA configured on the second frequency resource. However, RO #0 configured for the UE may be associated with two uplink data opportunities 510 (e.g., PO #0 and PO #1) on the first frequency resources and two uplink data opportunities 520 (e.g., PO #2 and PO #3) on the second frequency resource (as illustrated by the arrow). Similarly, RO #0A configured for the UE may be associated with two uplink data opportunities 520 (e.g., PO

0 and PO #1) on the second frequency resource and two uplink data opportunities 510 (e.g., PO #2 and PO #3) on the first frequency resource (as illustrated by the arrow). This frequency hopping pattern may be repeated within the same association period or across multiple association periods.

As discussed, in some aspects the DMRS transmitted in conjunction with the transmission of the one or more repetitions of the uplink message may be based on the selected random access opportunity. That is, the UE may select RO #0 (e.g., the first random access opportunity 505) with a corresponding DMRS index of #0. Accordingly, the UE may transmit the preamble during RO #0 and then transmit the one or more repetitions of the uplink message in the associated uplink data opportunities corresponding to RO #0/DMRS #0. This may include the UE transmitting one repetition of the uplink message in PO #0 and a second repetition of the uplink message in PO #1 on the first frequency resource, and a third repetition of the uplink message in PO #2 and a fourth repetition of the uplink message in PO #3 of the second frequency resource.

Similarly, the UE may transmit the preamble during RO #0A and then transmit the one or more repetitions of the uplink message in the associated uplink data opportunities corresponding to RO #0A/DMRS #0A on the second frequency resource. This may include the UE transmitting one repetition of the uplink message in PO #0A and a second repetition of the uplink message in PO #1A on the second frequency resource, and a third repetition of the uplink message in PO #2 and a fourth repetition of the uplink message in PO #3 on the first frequency resource.

This pattern may start over (e.g., within the same association period) at RO #4 and the POs associated with DMRS #0, and at RO #4A and the POs associated with DMRS #1. That is, the one or more uplink data opportunities associated with RO #4 start again in the first row of POs in the stack of POs shown in the first frequency resource of RACH configuration 500. Similarly, the one or more uplink data opportunities associated with RO #4A start again in the second row of POs in the stack of POs shown in second frequency resource of RACH configuration 500.

Accordingly, the set of configured random access opportunities (e.g., RO #0, through RO #7 in the first frequency resource and RO #0A through RO #7A in the second frequency resources) may be configured for the UE, with each random access opportunity having an associated set of one or more (with four being shown by way of non-limiting example only) uplink data opportunities (e.g., POs) that hop between repetitions. In some aspects, the POs (e.g., the one or more uplink data opportunities) may be associated with, or otherwise configured for, NR-Light dedicated preambles. Although not shown in RACH configuration 500, it is to be understood that there may be other POs configured for the UE (or other UEs) that are associated with non-repetition-based uplink message transmissions. For example, these other POs may be associated with DMRS #3 (not shown) and used for PUSCH transmissions without repetition.

Figure 6:
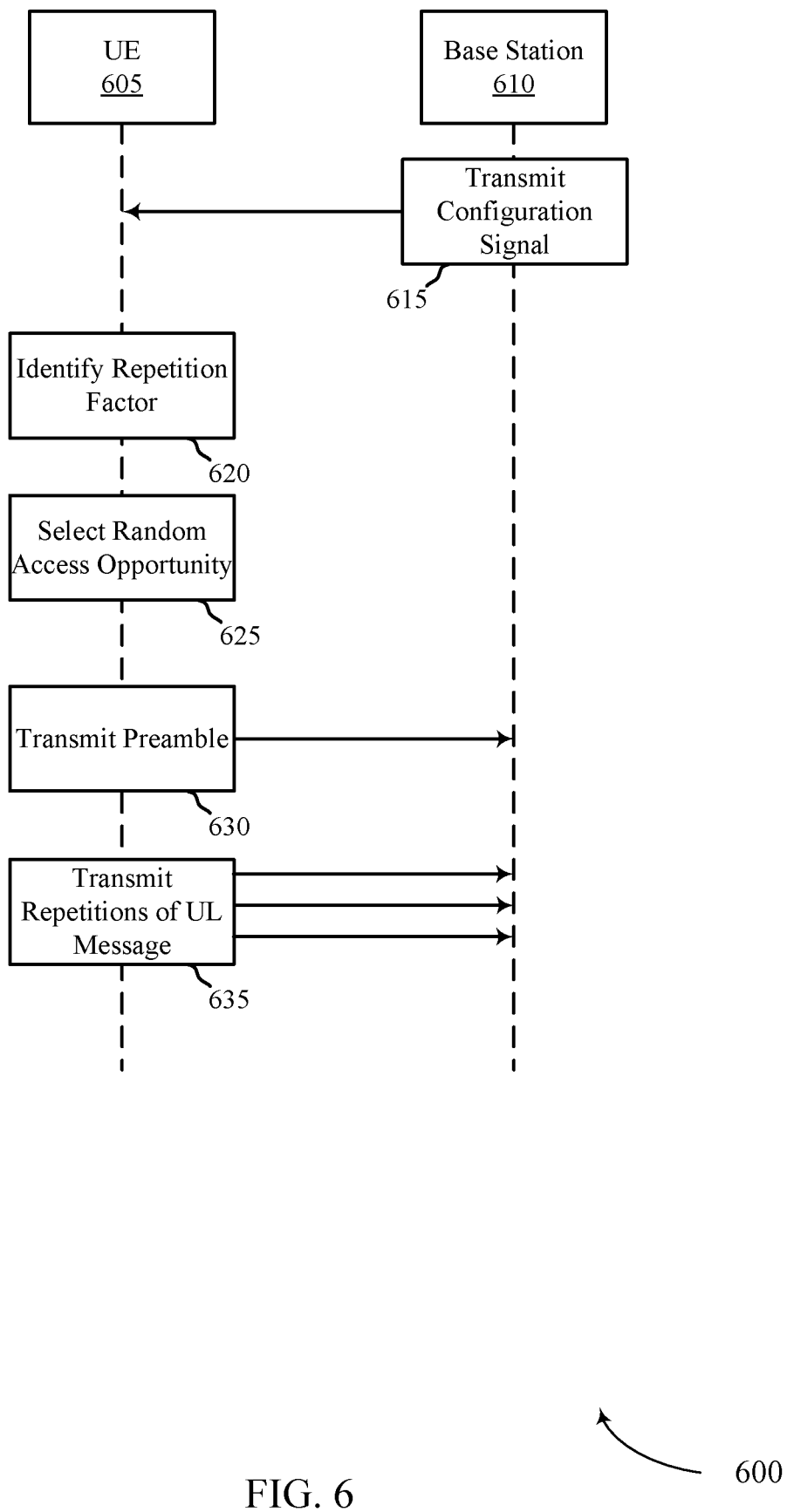
FIG. 6 illustrates an example of a process that supports efficient NR-Light message A repetition in two-step RACH procedure in accordance with aspects of the present disclosure.

FIG. 6 illustrates an example of a process 600 that supports efficient NR-Light message A repetition in two-step RACH procedure in accordance with aspects of the present disclosure. In some examples, process 600 may implement aspects of wireless communication system 100 and/or RACH configurations 200, 300, 400, and/or 500. Aspects of process 600 may be implemented by UE 605 and/or base station 610, which may be examples of the corresponding devices described herein.

At 615, the base station 610 may transmit (and the UE 605 may receive) a configuration signal that configures the UE 605 with a set of random access opportunities (e.g., ROs) over which to transmit a preamble associated with a random access procedure. Each random access opportunity may be associated with a set of one or more uplink data opportunities (e.g. POs). In some aspects, the configuration signal may include a synchronization signal, a system information signal, a reference signal, a RRC signal, or any combination thereof. In one example, the configuration signal may be an RMSI. In some aspects, the set of one or more uplink data opportunities associated with a random access opportunity may be repeated within an association period, or may repeat across multiple association periods.

At 620, the UE 605 may identify a repetition parameter for an uplink message. That is, the UE 605 may have an uplink message for transmission, which the UE 605 wishes to send multiple repetitions of. Accordingly, the repetition parameter may correspond to the number of repetitions of the uplink message that the UE 605 wishes to send. In some examples, the repetition parameter may include a safety factor, e.g., may indicate four repetitions of the uplink message for transmission, when only three repetitions of the uplink message are needed.

At 625, the UE 605 may select a random access opportunity from the set of configured random access opportunities for transmitting the preamble based at least in part on the repetition parameter. That is, the UE 605 may identify, for each configured random access opportunity, the number of associated uplink data opportunities. If the number of associated uplink data opportunities satisfies the repetition parameter, The UE 605 may select the corresponding random access opportunity for transmission of the preamble.

That is, the UE 605 may determine, based on the repetition parameter, the number of repetitions of the uplink message. the UE 605 may select a random access opportunity based on the number of uplink data opportunities in the set of one or more uplink data opportunities associated with the selected random access opportunity and the number of repetitions of the uplink message.

In some aspects, this may include the UE 605 determining that the set of random access opportunities comprise multiple consecutive random access opportunities associated with the same SSB index within an association period. The number of the multiple consecutive random access opportunities may be at least the number of the one or more repetitions of the uplink message. Accordingly, the UE 605 may transmit the one or more repetitions of the uplink message within the association period.

In some aspects, this may include the UE 605 determining that the set of random access opportunities include one or more random access opportunities associated with a single SSB index within an association period. The number of the one or more random access opportunities may be less than a number of the one or more repetitions of the uplink message. Accordingly, the UE 605 may transmit, based on this determination, the one or more repetitions of the uplink message across a plurality of association periods.

In some aspects, this may include the UE 605 determining that the set of one or more uplink data opportunities associated with the selected random access opportunity includes an unused number of uplink data opportunities that is less than a threshold number of uplink data opportunities. In this context, the UE 605 may refrain from using the unused number of uplink data opportunities and, in some examples, reallocate those unused number of uplink data opportunities for a non-repetition-based uplink message transmission.

Accordingly and at 630, the UE 605 may transmit (and the base station 610 may receive) the preamble on the selected random access opportunity. At 635, the UE 605 may transmit (and the base station 610 may receive) the one or more repetitions of the uplink message (with three repetitions shown by way of non-limiting example) based on the set of one or more uplink data opportunities associated with the selected random access opportunity.

In some aspects, this may include the UE 605 identifying reference signal resources (e.g., DMRS resources) based on the selected random access opportunity. The UE 605 may transmit (and the base station 610 may receive), in conjunction with transmission of the one or more repetitions of the uplink message, one or more reference signals using the reference signal resources.

In some aspects, this may include the UE 605 identifying, for each random access opportunity in the set of configured random access opportunities, an associated frequency hopping pattern. The UE 605 may select the random access opportunity based at least in part on the associated frequency hopping pattern. That is, the UE 605 may identify, based on the selected random access opportunity, the frequency hopping pattern for the associated set of one or more uplink data opportunities. The UE 605 may transmit (and the base station 610 may receive) the preamble on the selected random access opportunity over a first frequency resource, and transmit the one or more repetitions of the uplink message over the first frequency resource and a second frequency resource according to the frequency hopping pattern.

In some aspects, the frequency hopping pattern may be an inter-slot frequency hopping pattern. For example, the UE 605 may transmit (and the base station 610 may receive) the preamble over the first frequency resource during a first slot, and then transmit at least one repetition of the uplink message over the second frequency resource during a second slot. In this context, the UE 605 may identify a reference signal resources based on the selected random access opportunity, with the reference signal resources (e.g., DMRS) being the same across the first frequency resource and the second frequency resource.

Figure 7:
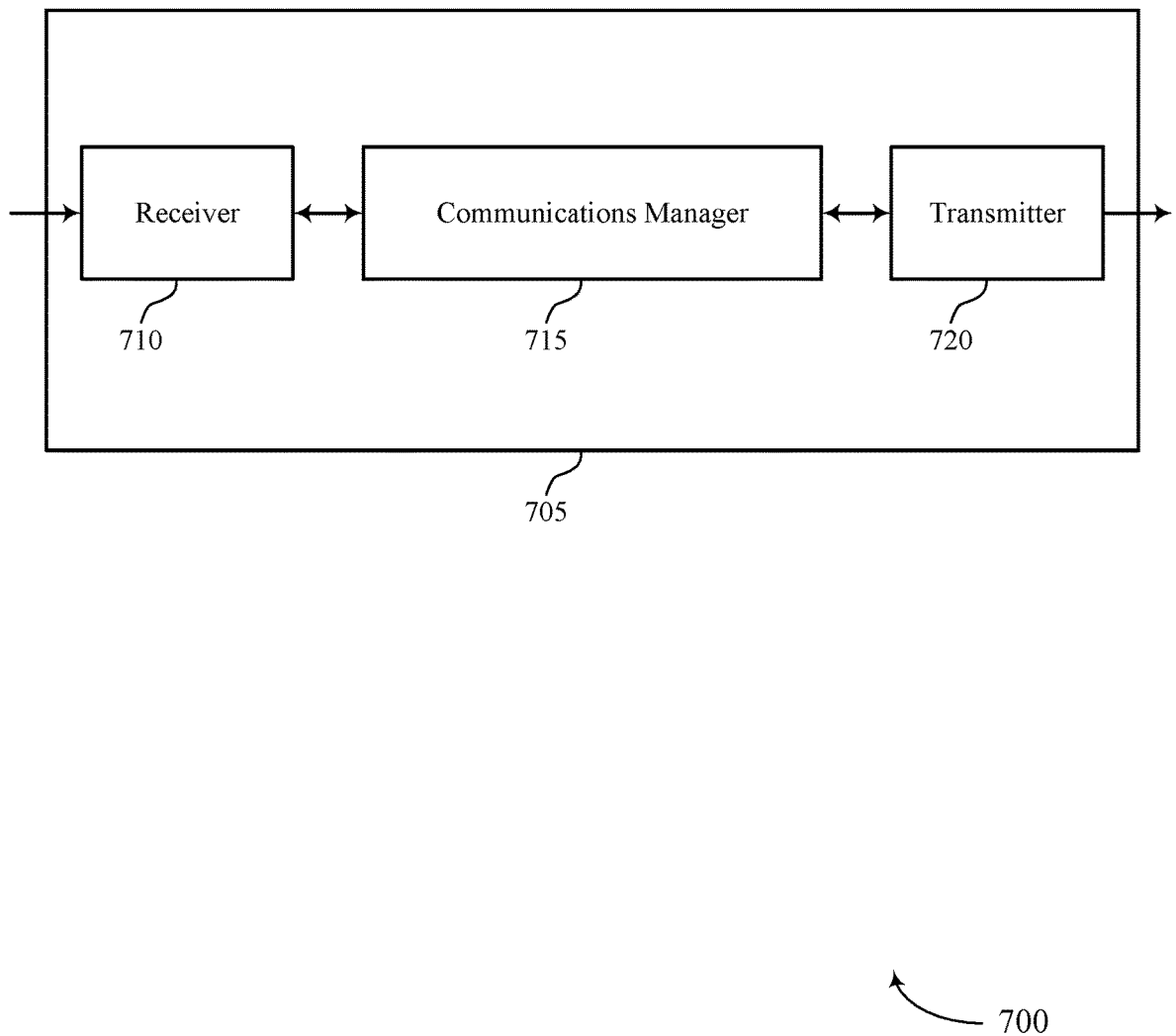
FIGS. 7 and 8 show block diagrams of devices that support efficient NR-Light message A repetition in two-step RACH procedure in accordance with aspects of the present disclosure.

FIG. 7 shows a block diagram 700 of a device 705 that supports efficient NR-Light message A repetition in two-step RACH procedure in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to efficient NR-Light message A repetition in two-step RACH procedure). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration signal configuring a set of random access opportunities over which to transmit a preamble associated with a random access procedure, each random access opportunity associated with a set of one or more uplink data opportunities, identify a repetition parameter for an uplink message, select a random access opportunity from the set of configured random access opportunities for transmitting the preamble based on the repetition parameter, transmit the preamble on the selected random access opportunity, and transmit one or more repetitions of the uplink message based on the set of one or more uplink data opportunities associated with the selected random access opportunity. The communications manager 715 may be an example of aspects of the communications manager 1010 described herein.

The communications manager 715, or its sub-components, may be implemented in hardware, software (e.g., executed by a processor), or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
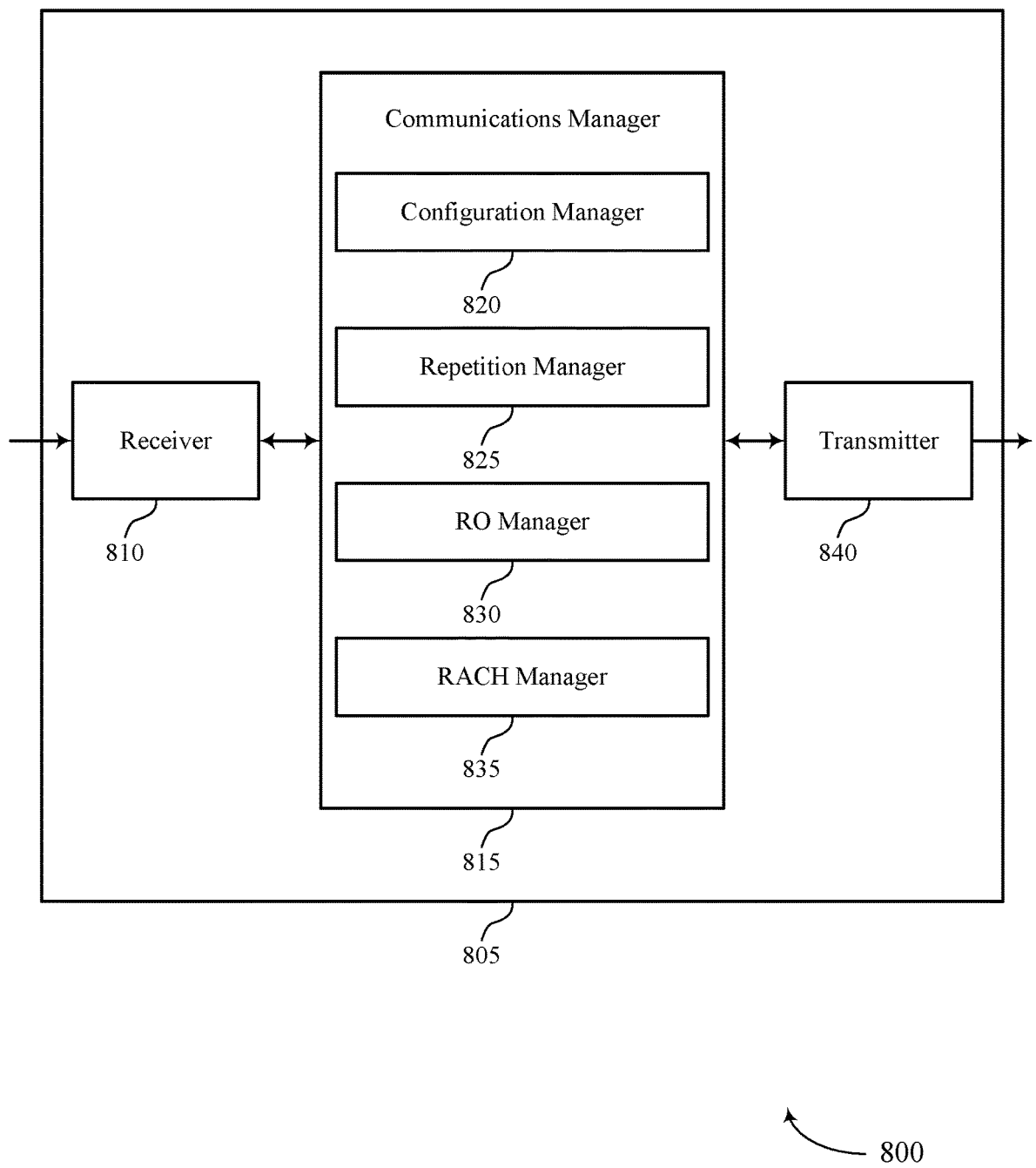

FIG. 8 shows a block diagram 800 of a device 805 that supports efficient NR-Light message A repetition in two-step RACH procedure in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to efficient NR-Light message A repetition in two-step RACH procedure). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, a repetition manager 825, a RO manager 830, and a RACH manager 835. The communications manager 815 may be an example of aspects of the communications manager 1010 described herein.

The configuration manager 820 may receive a configuration signal configuring a set of random access opportunities over which to transmit a preamble associated with a random access procedure, each random access opportunity associated with a set of one or more uplink data opportunities.

The repetition manager 825 may identify a repetition parameter for an uplink message.

The RO manager 830 may select a random access opportunity from the set of configured random access opportunities for transmitting the preamble based on the repetition parameter.

The RACH manager 835 may transmit the preamble on the selected random access opportunity and transmit one or more repetitions of the uplink message based on the set of one or more uplink data opportunities associated with the selected random access opportunity.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
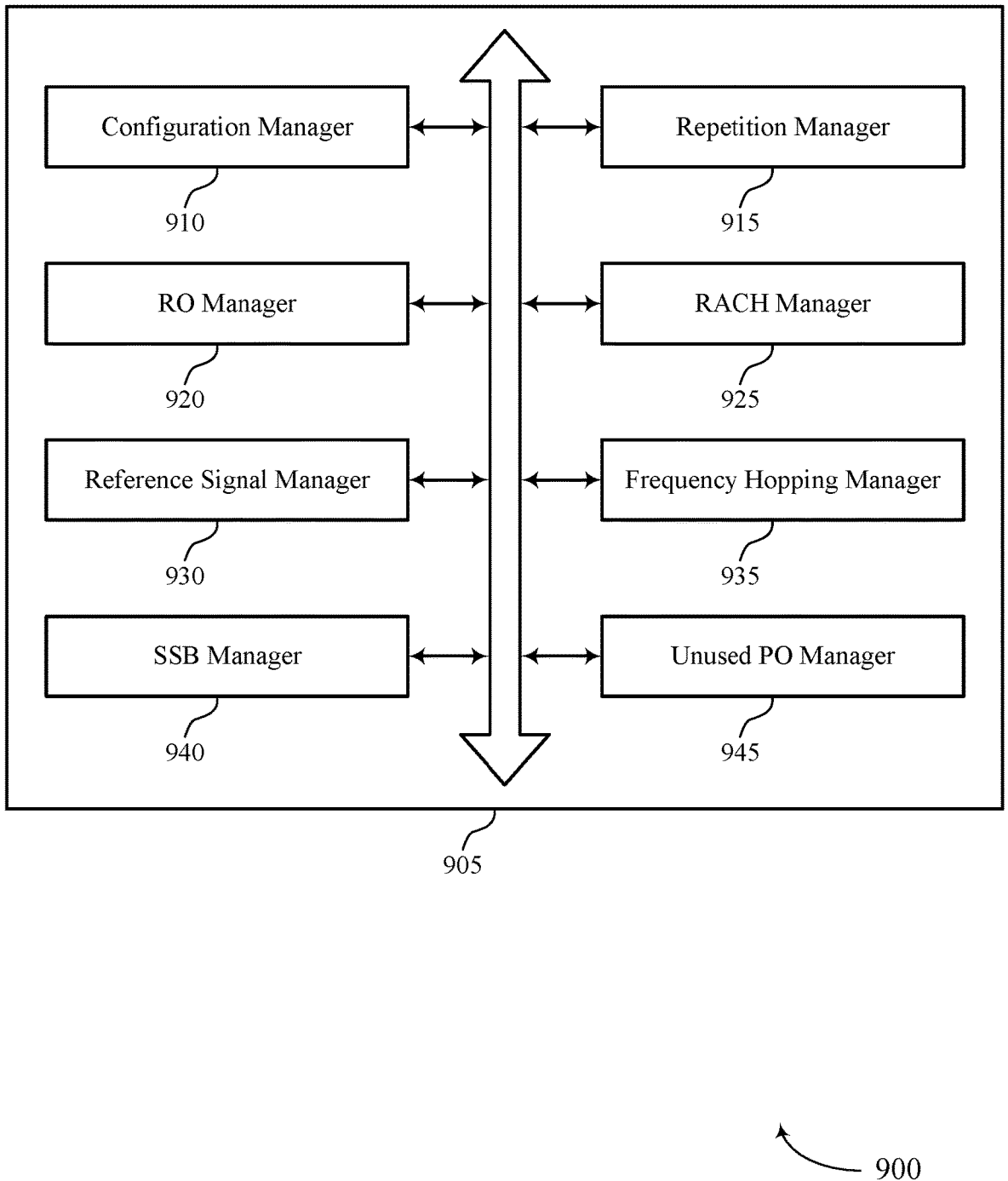
FIG. 9 shows a block diagram of a communications manager that supports efficient NR-Light message A repetition in two-step RACH procedure in accordance with aspects of the present disclosure.

FIG. 9 shows a block diagram 900 of a communications manager 905 that supports efficient NR-Light message A repetition in two-step RACH procedure in accordance with aspects of the present disclosure. The communications manager 905 may be an example of aspects of a communications manager 715, a communications manager 815, or a communications manager 1010 described herein. The communications manager 905 may include a configuration manager 910, a repetition manager 915, a RO manager 920, a RACH manager 925, a reference signal manager 930, a frequency hopping manager 935, a SSB manager 940, and an unused PO manager 945. Each of these modules may communicate, directly or indirectly, with one another (e.g., via one or more buses).

The configuration manager 910 may receive a configuration signal configuring a set of random access opportunities over which to transmit a preamble associated with a random access procedure, each random access opportunity associated with a set of one or more uplink data opportunities. In some cases, the configuration signal includes at least one of a synchronization signal, or a system information signal, or a reference signal, or a RRC signal, or a combination thereof.

The repetition manager 915 may identify a repetition parameter for an uplink message. In some examples, the repetition manager 915 may determine, based on the repetition parameter, a number of repetitions of the uplink message.

In some examples, the repetition manager 915 may select the random access opportunity based on a number of uplink data opportunities in the set of one or more uplink data opportunities associated with the selected random access opportunity and the number of repetitions of the uplink message. In some cases, the set of one or more uplink data opportunities associated with a random access opportunity are repeated within an association period of a SSB-RO-preamble association or repeat across multiple association periods of the SSB-RO-preamble association, wherein the association period of the SSB-RO-preamble association is identified in a RMSI. In some aspects, the repetition pattern of the set of one or more uplink data opportunities associated with a random access opportunity do not exceed one association pattern period of the SSB-RO-preamble association identified in the RMSI. In some aspects, the repetition pattern of the set of one or more uplink data opportunities associated with a random access opportunity are repeated across multiple association pattern periods of the SSB-RO-preamble association identified in the RMSI.

The RO manager 920 may select a random access opportunity from the set of configured random access opportunities for transmitting the preamble based on the repetition parameter. The RO manager 920 may determine that a second uplink message is to be transmitted. The RO manager 920 may select an arbitrary random access opportunity and corresponding uplink data opportunity for transmission of the second uplink message by selecting a preamble and a demodulation reference signal resource from a non-repetition-specific preamble group and a non-repetition-specific demodulation reference signal resource pool.

The RACH manager 925 may transmit the preamble on the selected random access opportunity. In some examples, the RACH manager 925 may transmit one or more repetitions of the uplink message based on the set of one or more uplink data opportunities associated with the selected random access opportunity.

The reference signal manager 930 may identify reference signal resources based on the selected random access opportunity. In some examples, the reference signal manager 930 may transmit, in conjunction with transmission of the one or more repetitions of the uplink message, one or more reference signals using the reference signal resources.

The frequency hopping manager 935 may identify, for each random access opportunity in the set of random access opportunities, an associated frequency hopping pattern. In some examples, the frequency hopping manager 935 may select the random access opportunity based on the associated frequency hopping pattern.

In some examples, the frequency hopping manager 935 may identify, based on the selected random access opportunity, a frequency hopping pattern for the associated set of one or more uplink data opportunities. In some examples, the frequency hopping manager 935 may transmit the preamble on the selected random access opportunity over a first frequency resource. In some examples, the frequency hopping manager 935 may transmit the one or more repetitions of the uplink message over the first frequency resource and a second frequency resource according to the frequency hopping pattern.

In some examples, the frequency hopping manager 935 may transmit the preamble over the first frequency resource during a first slot. In some examples, the frequency hopping manager 935 may transmit the at least one repetition of the uplink message over the second frequency resource during a second slot. In some examples, the frequency hopping manager 935 may identify reference signal resources based on the selected random access opportunity, where the reference signal resources are the same across the first frequency resource and the second frequency resource.

The SSB manager 940 may determine that the set of random access opportunities include multiple consecutive random access opportunities associated with the same SSB index within an association period, where the number of the multiple consecutive random access opportunities is at least the number of the one or more repetitions of the uplink message. In some examples, the SSB manager 940 may transmit the one or more repetitions of the uplink message within the association period.

In some examples, the SSB manager 940 may determine that the set of random access opportunities include one or more random access opportunities associated with a SSB index within an association period, where a number of the one or more random access opportunities is less than a number of the one or more repetitions of the uplink message.

In some examples, the SSB manager 940 may transmit, based on the determining, the one or more repetitions of the uplink message across a set of association periods.

The unused PO manager 945 may determine that the set of one or more uplink data opportunities associated with the selected random access opportunities includes an unused number of uplink data opportunities that is less than a threshold number of uplink data opportunities. In some examples, the unused PO manager 945 may refrain from using the unused number of uplink data opportunities. In some examples, the unused PO manager 945 may reallocate the unused number of uplink data opportunities for a non-repetition-based uplink message.

Figure 10:
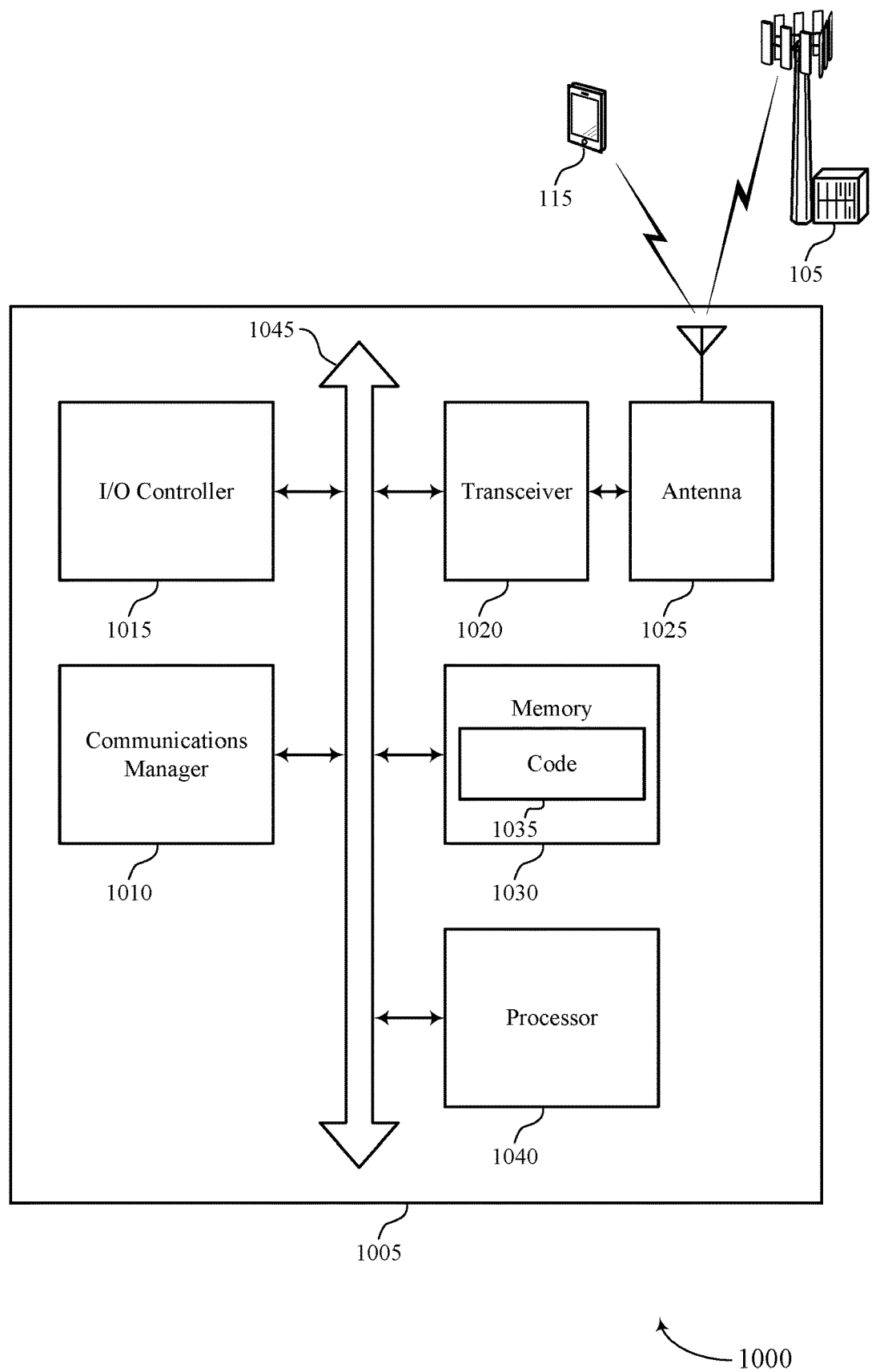
FIG. 10 shows a diagram of a system including a device that supports efficient NR-Light message A repetition in two-step RACH procedure in accordance with aspects of the present disclosure.

FIG. 10 shows a diagram of a system 1000 including a device 1005 that supports efficient NR-Light message A repetition in two-step RACH procedure in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a configuration signal configuring a set of random access opportunities over which to transmit a preamble associated with a random access procedure, each random access opportunity associated with a set of one or more uplink data opportunities, identify a repetition parameter for an uplink message, select a random access opportunity from the set of configured random access opportunities for transmitting the preamble based on the repetition parameter, transmit the preamble on the selected random access opportunity, and transmit one or more repetitions of the uplink message based on the set of one or more uplink data opportunities associated with the selected random access opportunity.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1005 may include a single antenna 1025. However, in some cases the device 1005 may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting efficient NR-Light message A repetition in two-step RACH procedure).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
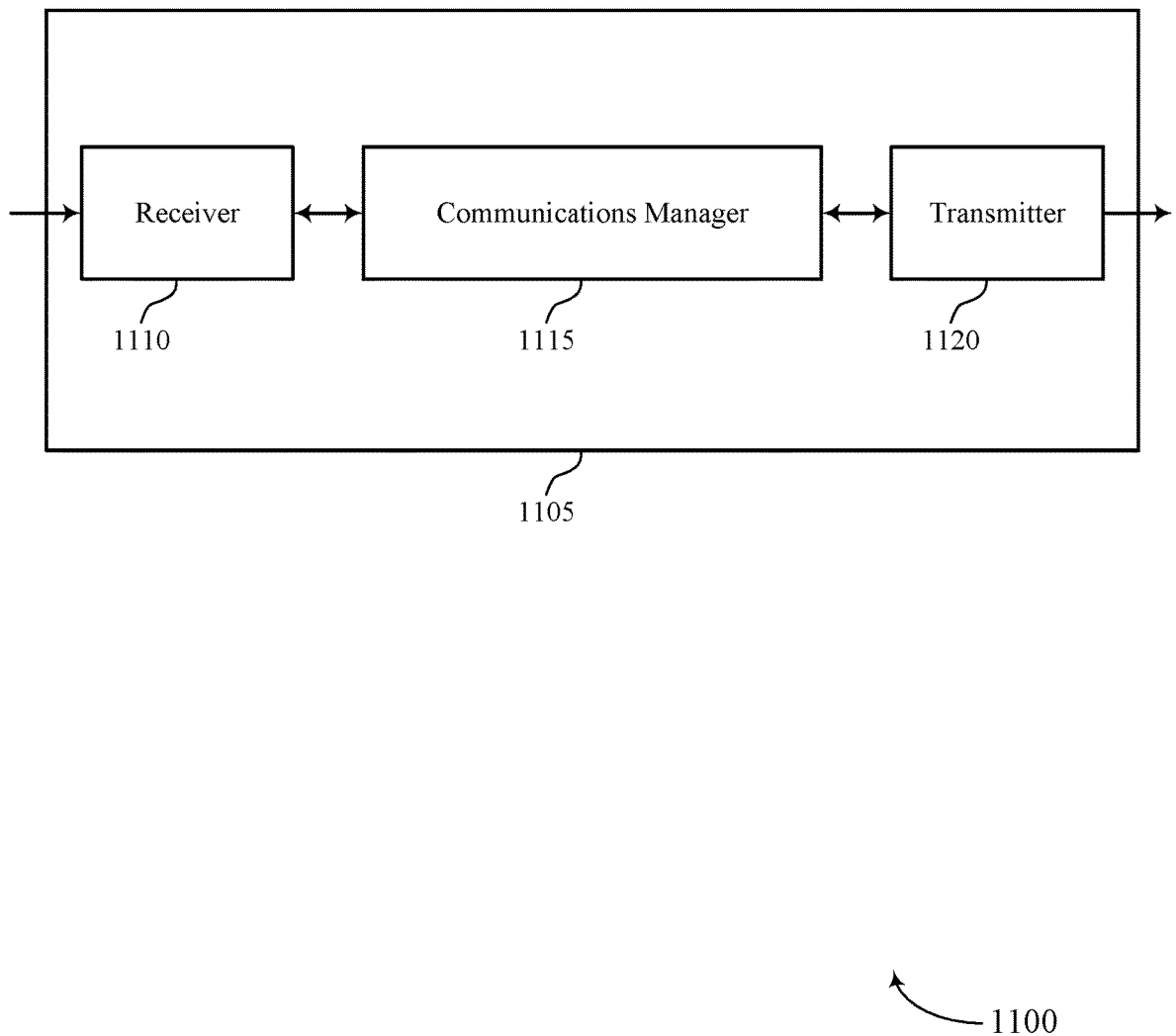
FIGS. 11 and 12 show block diagrams of devices that support efficient NR-Light message A repetition in two-step RACH procedure in accordance with aspects of the present disclosure.

FIG. 11 shows a block diagram 1100 of a device 1105 that supports efficient NR-Light message A repetition in two-step RACH procedure in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to efficient NR-Light message A repetition in two-step RACH procedure). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a configuration signal configuring a set of random access opportunities over which a UE is to transmit a preamble associated with a random access procedure, each random access opportunity associated with a set of one or more uplink data opportunities, receive, from the UE, the preamble on a selected random access opportunity of the set of random access opportunities, and receive, from the UE and according to a repetition parameter for an uplink message, one or more repetitions of the uplink message based on the set of one or more uplink data opportunities associated with the selected random access opportunity. The communications manager 1115 may be an example of aspects of the communications manager 1410 described herein.

The communications manager 1115, or its sub-components, may be implemented in hardware, software (e.g., executed by a processor), or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
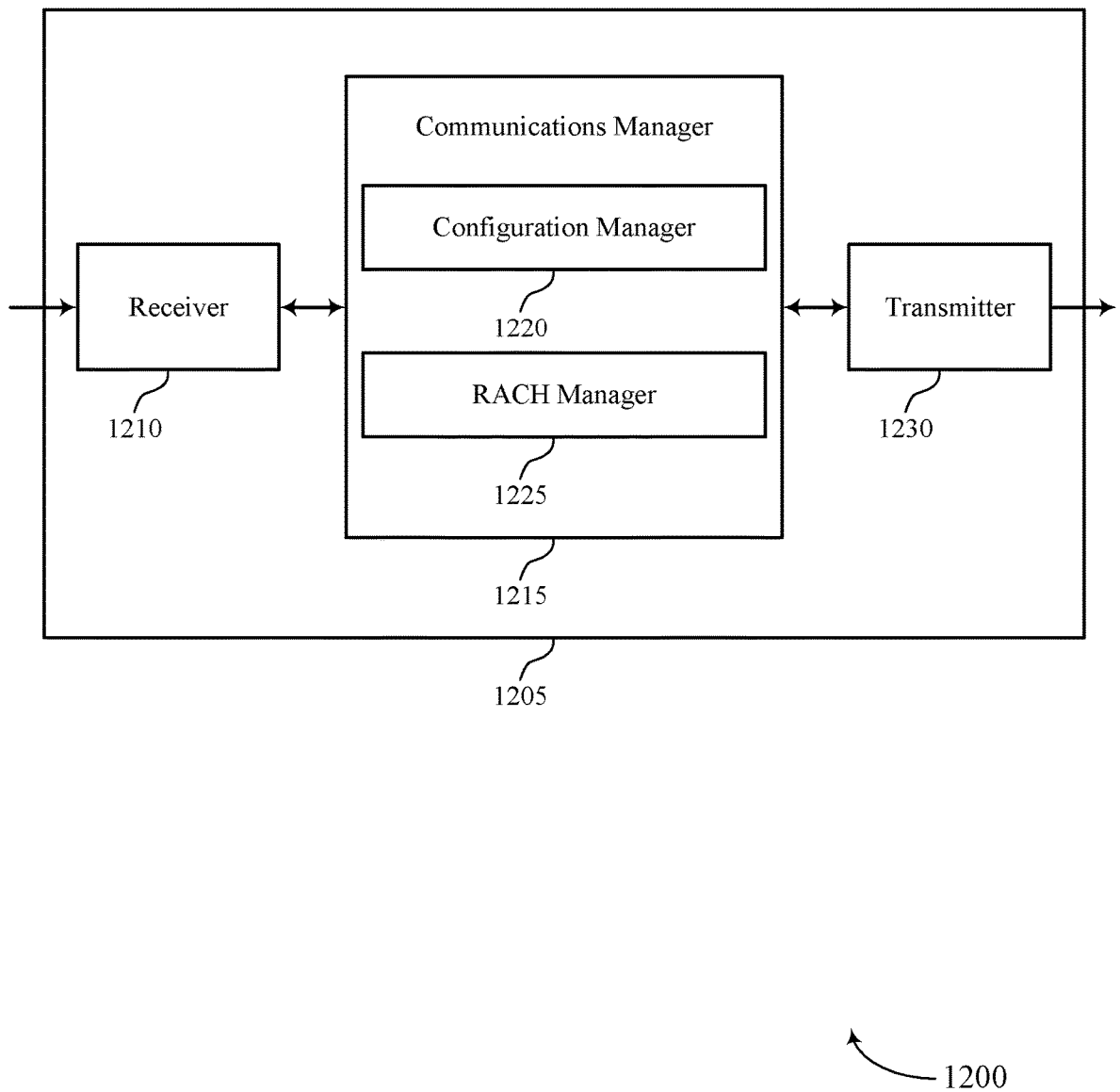

FIG. 12 shows a block diagram 1200 of a device 1205 that supports efficient NR-Light message A repetition in two-step RACH procedure in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to efficient NR-Light message A repetition in two-step RACH procedure). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220 and a RACH manager 1225. The communications manager 1215 may be an example of aspects of the communications manager 1410 described herein.

The configuration manager 1220 may transmit a configuration signal configuring a set of random access opportunities over which a UE is to transmit a preamble associated with a random access procedure, each random access opportunity associated with a set of one or more uplink data opportunities.

The RACH manager 1225 may receive, from the UE, the preamble on a selected random access opportunity of the set of random access opportunities and receive, from the UE and according to a repetition parameter for an uplink message, one or more repetitions of the uplink message based on the set of one or more uplink data opportunities associated with the selected random access opportunity.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
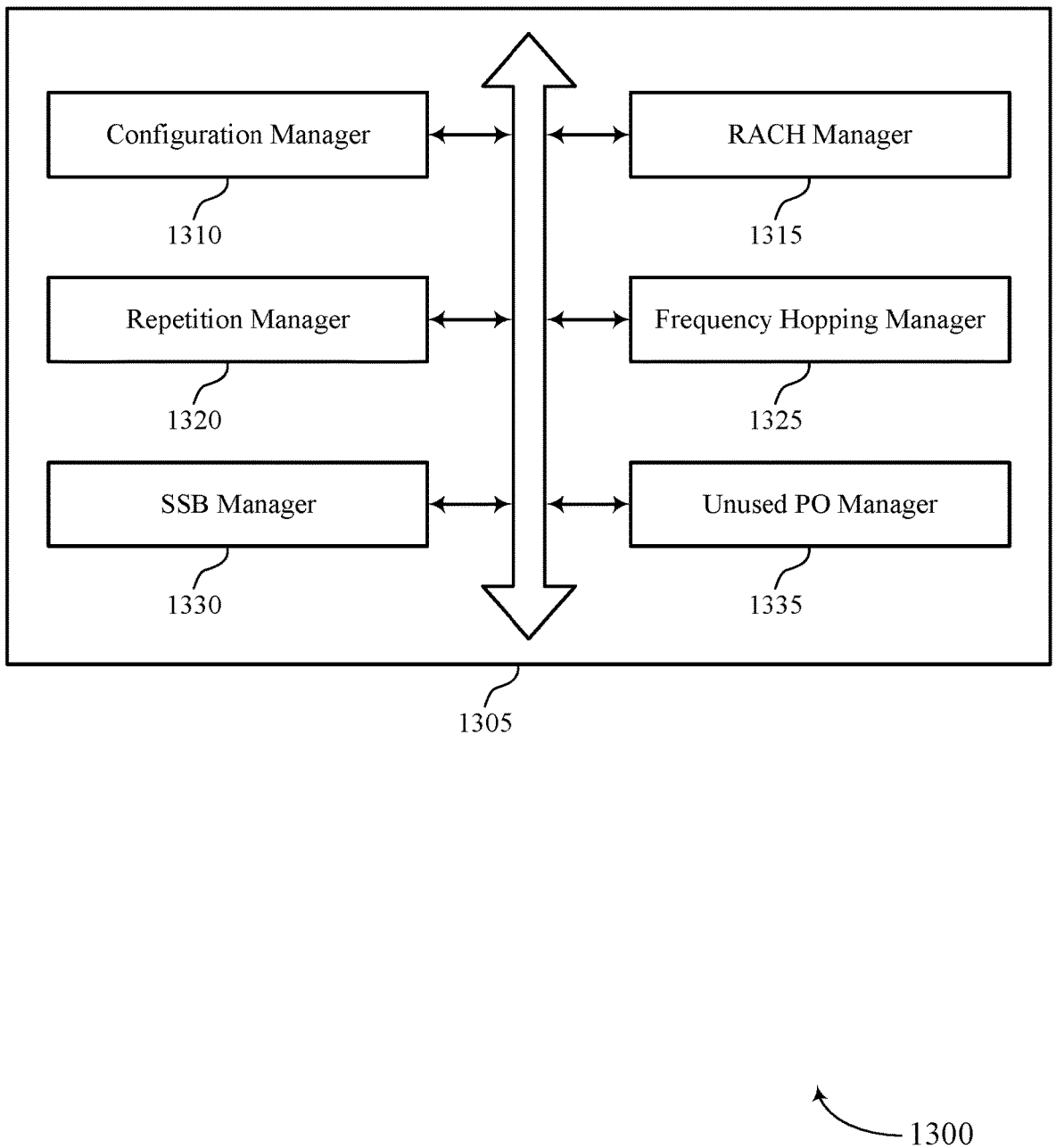
FIG. 13 shows a block diagram of a communications manager that supports efficient NR-Light message A repetition in two-step RACH procedure in accordance with aspects of the present disclosure.

FIG. 13 shows a block diagram 1300 of a communications manager 1305 that supports efficient NR-Light message A repetition in two-step RACH procedure in accordance with aspects of the present disclosure. The communications manager 1305 may be an example of aspects of a communications manager 1115, a communications manager 1215, or a communications manager 1410 described herein. The communications manager 1305 may include a configuration manager 1310, a RACH manager 1315, a repetition manager 1320, a frequency hopping manager 1325, a SSB manager 1330, and an unused PO manager 1335. Each of these modules may communicate, directly or indirectly, with one another (e.g., via one or more buses).

The configuration manager 1310 may transmit a configuration signal configuring a set of random access opportunities over which a UE is to transmit a preamble associated with a random access procedure, each random access opportunity associated with a set of one or more uplink data opportunities. In some cases, the configuration signal includes at least one of a synchronization signal, or a system information signal, or a reference signal, or a RRC signal, or a combination thereof.

The RACH manager 1315 may receive, from the UE, the preamble on a selected random access opportunity of the set of random access opportunities. In some examples, the RACH manager 1315 may receive, from the UE and according to a repetition parameter for an uplink message, one or more repetitions of the uplink message based on the set of one or more uplink data opportunities associated with the selected random access opportunity.

The repetition manager 1320 may identify reference signal resources based on the selected random access opportunity. In some examples, the repetition manager 1320 may receive, in conjunction with receipt of the one or more repetitions of the uplink message, one or more reference signals using the reference signal resources. In some cases, the set of one or more uplink data opportunities associated with a random access opportunity are repeated within an association period of a SSB-RO-preamble association or repeat across multiple association periods of the SSB-RO-preamble association, wherein the association period of the SSB-RO-preamble association is identified in a RMSI. In some aspects, the repetition pattern of the set of one or more uplink data opportunities associated with a random access opportunity do not exceed one association pattern period of the SSB-RO-preamble association identified in the RMSI. In some aspects, the repetition pattern of the set of one or more uplink data opportunities associated with a random access opportunity are repeated across multiple association pattern periods of the SSB-RO-preamble association identified in the RMSI.

The frequency hopping manager 1325 may identify, for each random access opportunity in the set of random access opportunities, an associated frequency hopping pattern, where the selected random access opportunity is based on the associated frequency hopping pattern. In some examples, the frequency hopping manager 1325 may identify, based on the selected random access opportunity, a frequency hopping pattern for the associated set of one or more uplink data opportunities. In some examples, the frequency hopping manager 1325 may receive the preamble on the selected random access opportunity over a first frequency resource. In some examples, the frequency hopping manager 1325 may receive the one or more repetitions of the uplink message over the first frequency resource and a second frequency resource according to the frequency hopping pattern. In some examples, the frequency hopping manager 1325 may receive the preamble over the first frequency resource during a first slot. In some examples, the frequency hopping manager 1325 may receive at least one repetition of the uplink message over the second frequency resource during a second slot. In some examples, the frequency hopping manager 1325 may identify reference signal resources based on the selected random access opportunity, where the reference signal resources are the same across the first frequency resource and the second frequency resource.

The SSB manager 1330 may determine that the set of random access opportunities include multiple consecutive random access opportunities associated with the same SSB index within an association period, where the number of the multiple consecutive random access opportunities is at least the number of the one or more repetitions of the uplink message. In some examples, the SSB manager 1330 may receive, based on the determining, the one or more repetitions of the uplink message within the association period. In some examples, the SSB manager 1330 may determine that the set of random access opportunities include one or more random access opportunities associated with a SSB index within an association period, where a number of the one or more random access opportunities is less than a number of the one or more repetitions of the uplink message. In some examples, the SSB manager 1330 may receive, based on the determining, the one or more repetitions of the uplink message across a set of association periods.

The unused PO manager 1335 may determine that the set of one or more uplink data opportunities associated with the selected random access opportunities include an unused number of uplink data opportunities that cannot guarantee a preferred number of uplink data opportunities. In some examples, the unused PO manager 1335 may refrain from receiving an uplink message on the unused number of uplink data opportunities. In some examples, the unused PO manager 1335 may reallocate the unused number of uplink data opportunities for a non-repetition-based uplink message.

Figure 14:
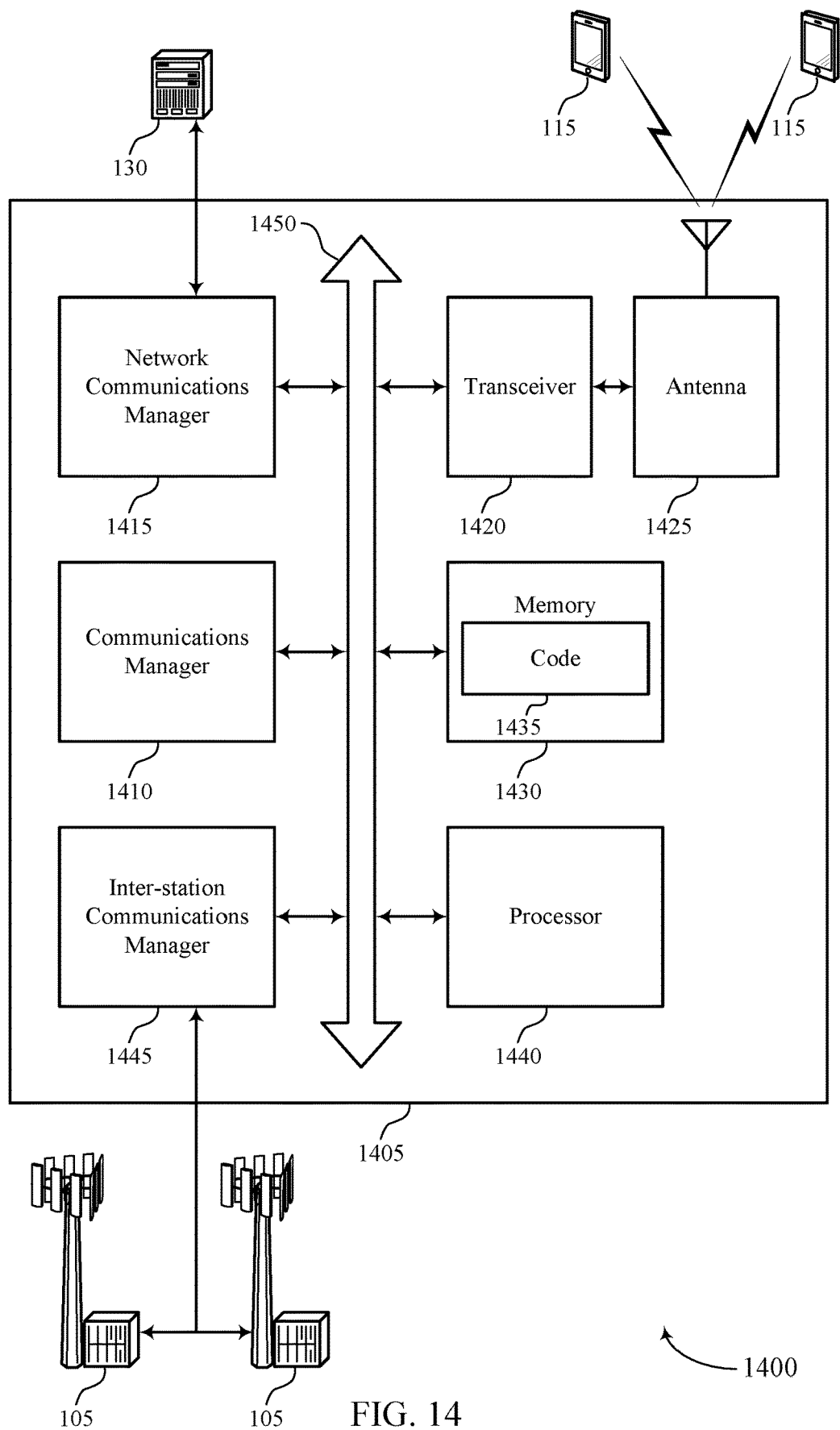
FIG. 14 shows a diagram of a system including a device that supports efficient NR-Light message A repetition in two-step RACH procedure in accordance with aspects of the present disclosure.

FIG. 14 shows a diagram of a system 1400 including a device 1405 that supports efficient NR-Light message A repetition in two-step RACH procedure in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a configuration signal configuring a set of random access opportunities over which a UE is to transmit a preamble associated with a random access procedure, each random access opportunity associated with a set of one or more uplink data opportunities, receive, from the UE, the preamble on a selected random access opportunity of the set of random access opportunities, and receive, from the UE and according to a repetition parameter for an uplink message, one or more repetitions of the uplink message based on the set of one or more uplink data opportunities associated with the selected random access opportunity.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1405 may include a single antenna 1425. However, in some cases the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting efficient NR-Light message A repetition in two-step RACH procedure).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
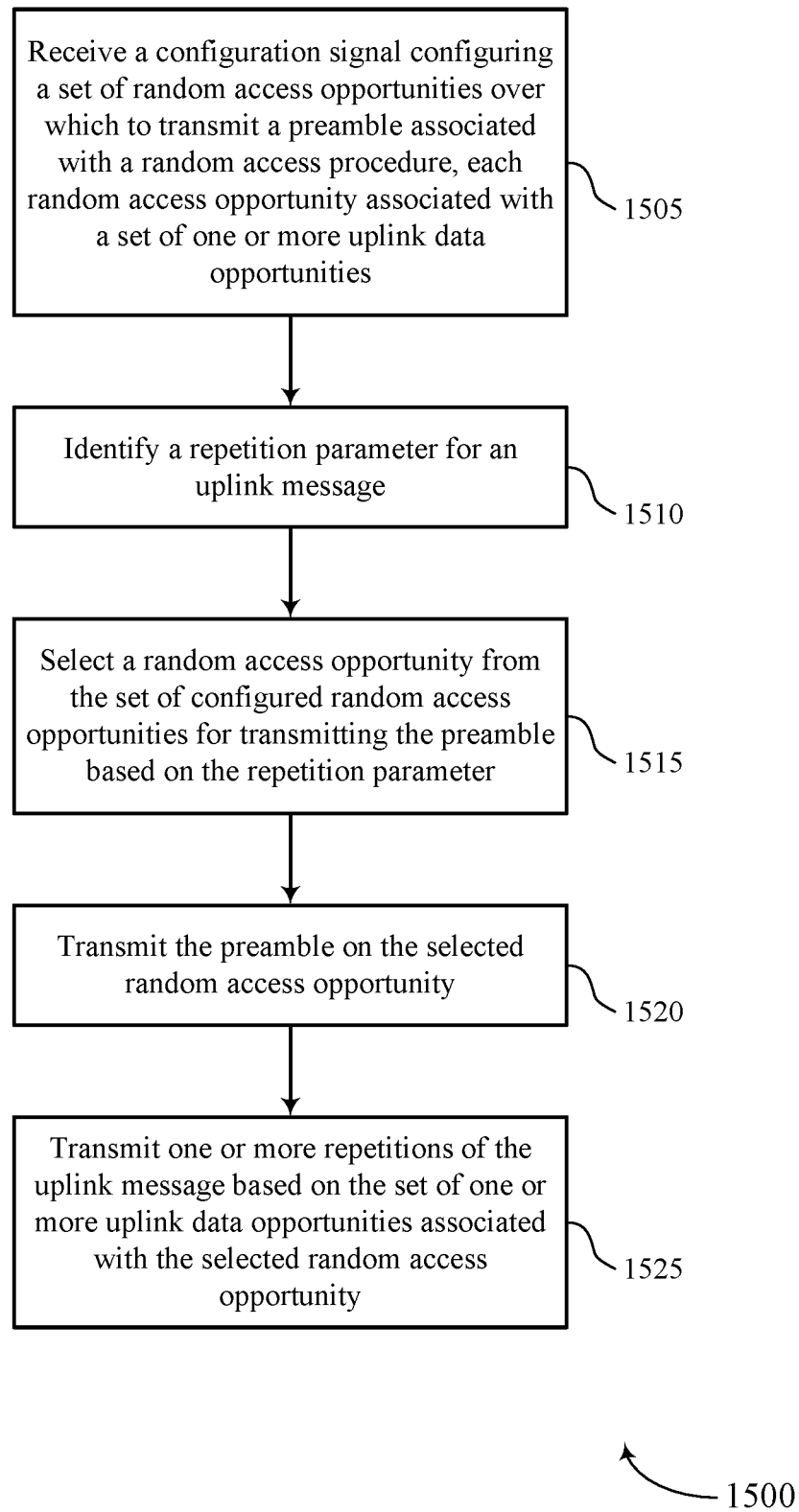
FIGS. 15 through 18 show flowcharts illustrating methods that support efficient NR-Light message A repetition in two-step RACH procedure in accordance with aspects of the present disclosure.

FIG. 15 shows a flowchart illustrating a method 1500 that supports efficient NR-Light message A repetition in two-step RACH procedure in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a configuration signal configuring a set of random access opportunities over which to transmit a preamble associated with a random access procedure, each random access opportunity associated with a set of one or more uplink data opportunities. The operations of 1505 may be performed according to the methods described herein. In some examples, aspects of the operations of 1505 may be performed by a configuration manager as described with reference to FIGS. 7 through 10.

At 1510, the UE may identify a repetition parameter for an uplink message. The operations of 1510 may be performed according to the methods described herein. In some examples, aspects of the operations of 1510 may be performed by a repetition manager as described with reference to FIGS. 7 through 10.

At 1515, the UE may select a random access opportunity from the set of configured random access opportunities for transmitting the preamble based on the repetition parameter. The operations of 1515 may be performed according to the methods described herein. In some examples, aspects of the operations of 1515 may be performed by a RO manager as described with reference to FIGS. 7 through 10.

At 1520, the UE may transmit the preamble on the selected random access opportunity. The operations of 1520 may be performed according to the methods described herein. In some examples, aspects of the operations of 1520 may be performed by a RACH manager as described with reference to FIGS. 7 through 10.

At 1525, the UE may transmit one or more repetitions of the uplink message based on the set of one or more uplink data opportunities associated with the selected random access opportunity. The operations of 1525 may be performed according to the methods described herein. In some examples, aspects of the operations of 1525 may be performed by a RACH manager as described with reference to FIGS. 7 through 10.

Figure 16:
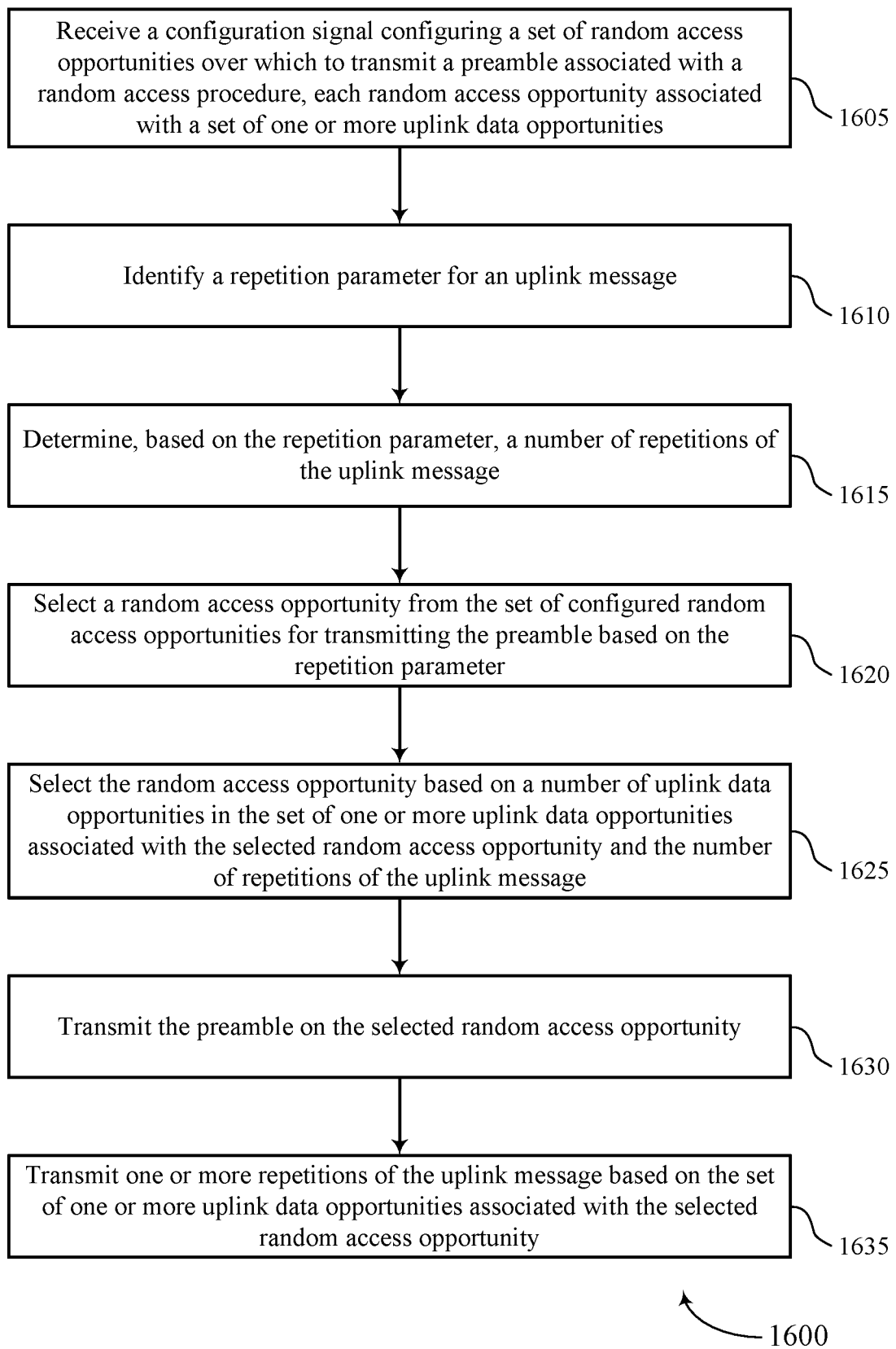

FIG. 16 shows a flowchart illustrating a method 1600 that supports efficient NR-Light message A repetition in two-step RACH procedure in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a configuration signal configuring a set of random access opportunities over which to transmit a preamble associated with a random access procedure, each random access opportunity associated with a set of one or more uplink data opportunities. The operations of 1605 may be performed according to the methods described herein. In some examples, aspects of the operations of 1605 may be performed by a configuration manager as described with reference to FIGS. 7 through 10.

At 1610, the UE may identify a repetition parameter for an uplink message. The operations of 1610 may be performed according to the methods described herein. In some examples, aspects of the operations of 1610 may be performed by a repetition manager as described with reference to FIGS. 7 through 10.

At 1615, the UE may determine, based on the repetition parameter, a number of repetitions of the uplink message. The operations of 1615 may be performed according to the methods described herein. In some examples, aspects of the operations of 1615 may be performed by a repetition manager as described with reference to FIGS. 7 through 10.

At 1620, the UE may select a random access opportunity from the set of configured random access opportunities for transmitting the preamble based on the repetition parameter. The operations of 1620 may be performed according to the methods described herein. In some examples, aspects of the operations of 1620 may be performed by a RO manager as described with reference to FIGS. 7 through 10.

At 1625, the UE may select the random access opportunity based on a number of uplink data opportunities in the set of one or more uplink data opportunities associated with the selected random access opportunity and the number of repetitions of the uplink message. The operations of 1625 may be performed according to the methods described herein. In some examples, aspects of the operations of 1625 may be performed by a repetition manager as described with reference to FIGS. 7 through 10.

At 1630, the UE may transmit the preamble on the selected random access opportunity. The operations of 1630 may be performed according to the methods described herein. In some examples, aspects of the operations of 1630 may be performed by a RACH manager as described with reference to FIGS. 7 through 10.

At 1635, the UE may transmit one or more repetitions of the uplink message based on the set of one or more uplink data opportunities associated with the selected random access opportunity. The operations of 1635 may be performed according to the methods described herein. In some examples, aspects of the operations of 1635 may be performed by a RACH manager as described with reference to FIGS. 7 through 10.

Figure 17:
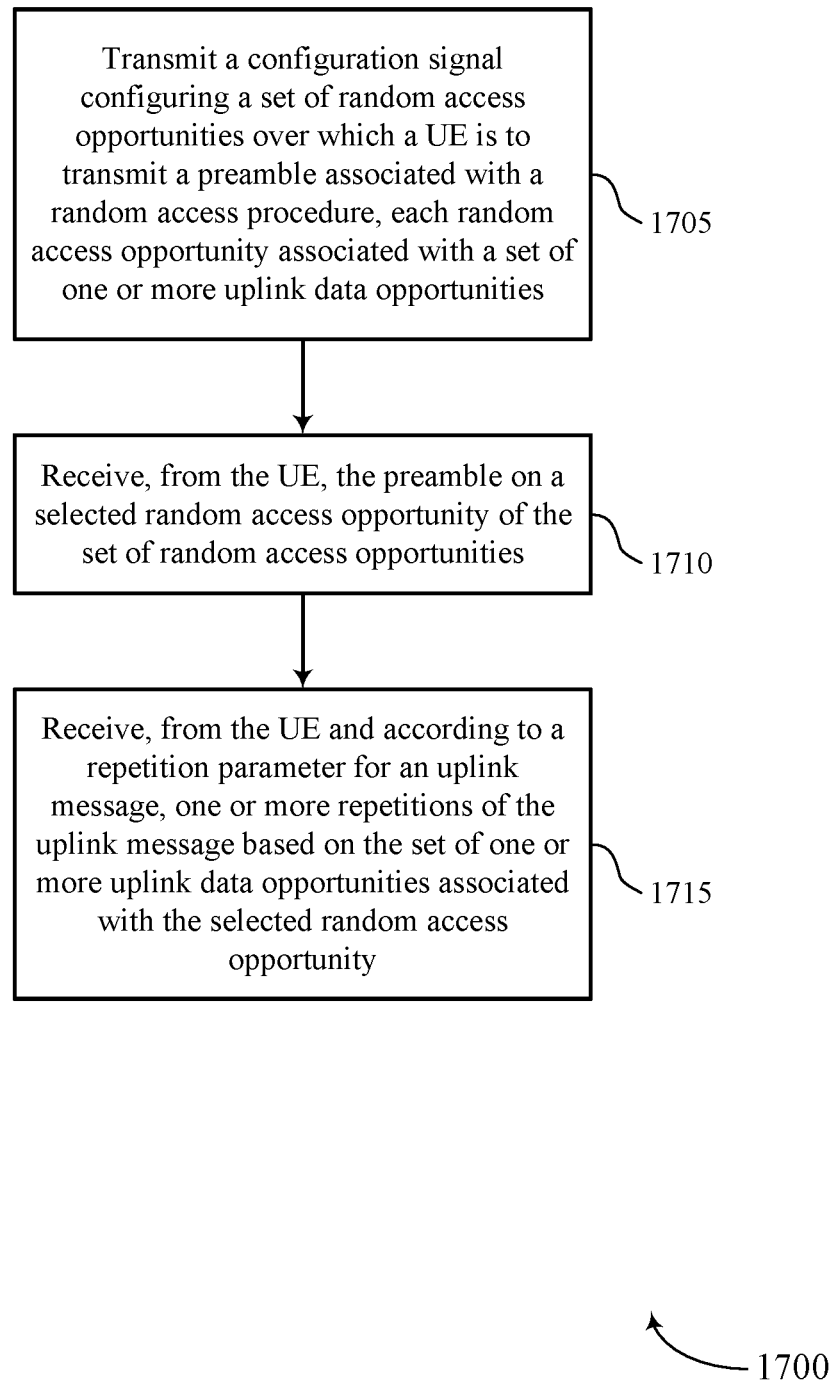

FIG. 17 shows a flowchart illustrating a method 1700 that supports efficient NR-Light message A repetition in two-step RACH procedure in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit a configuration signal configuring a set of random access opportunities over which a UE is to transmit a preamble associated with a random access procedure, each random access opportunity associated with a set of one or more uplink data opportunities. The operations of 1705 may be performed according to the methods described herein. In some examples, aspects of the operations of 1705 may be performed by a configuration manager as described with reference to FIGS. 11 through 14.

At 1710, the base station may receive, from the UE, the preamble on a selected random access opportunity of the set of random access opportunities. The operations of 1710 may be performed according to the methods described herein. In some examples, aspects of the operations of 1710 may be performed by a RACH manager as described with reference to FIGS. 11 through 14.

At 1715, the base station may receive, from the UE and according to a repetition parameter for an uplink message, one or more repetitions of the uplink message based on the set of one or more uplink data opportunities associated with the selected random access opportunity. The operations of 1715 may be performed according to the methods described herein. In some examples, aspects of the operations of 1715 may be performed by a RACH manager as described with reference to FIGS. 11 through 14.

Figure 18:
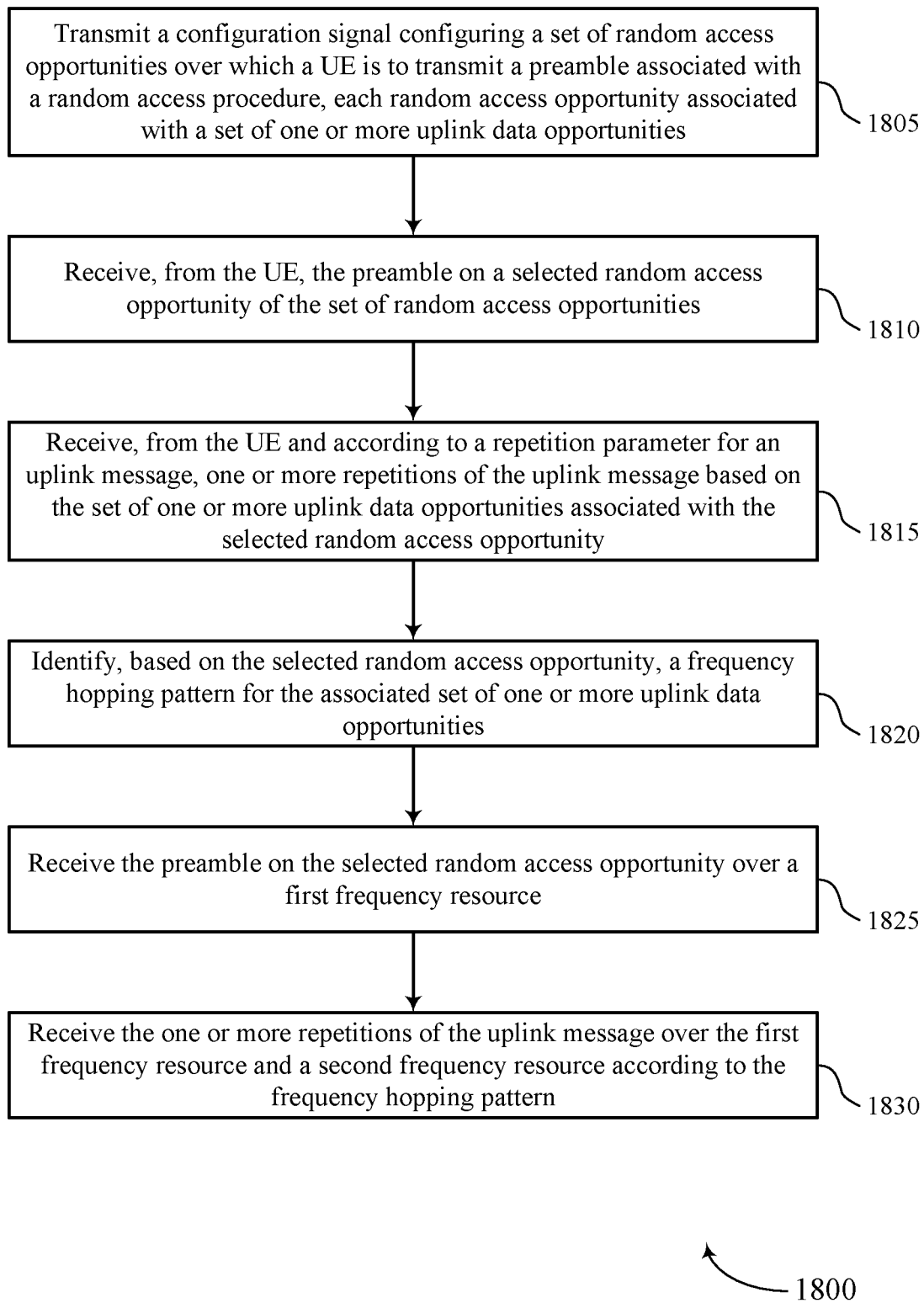

FIG. 18 shows a flowchart illustrating a method 1800 that supports efficient NR-Light message A repetition in two-step RACH procedure in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit a configuration signal configuring a set of random access opportunities over which a UE is to transmit a preamble associated with a random access procedure, each random access opportunity associated with a set of one or more uplink data opportunities. The operations of 1805 may be performed according to the methods described herein. In some examples, aspects of the operations of 1805 may be performed by a configuration manager as described with reference to FIGS. 11 through 14.

At 1810, the base station may receive, from the UE, the preamble on a selected random access opportunity of the set of random access opportunities. The operations of 1810 may be performed according to the methods described herein. In some examples, aspects of the operations of 1810 may be performed by a RACH manager as described with reference to FIGS. 11 through 14.

At 1815, the base station may receive, from the UE and according to a repetition parameter for an uplink message, one or more repetitions of the uplink message based on the set of one or more uplink data opportunities associated with the selected random access opportunity. The operations of 1815 may be performed according to the methods described herein. In some examples, aspects of the operations of 1815 may be performed by a RACH manager as described with reference to FIGS. 11 through 14.

At 1820, the base station may identify, based on the selected random access opportunity, a frequency hopping pattern for the associated set of one or more uplink data opportunities. The operations of 1820 may be performed according to the methods described herein. In some examples, aspects of the operations of 1820 may be performed by a frequency hopping manager as described with reference to FIGS. 11 through 14.

At 1825, the base station may receive the preamble on the selected random access opportunity over a first frequency resource. The operations of 1825 may be performed according to the methods described herein. In some examples, aspects of the operations of 1825 may be performed by a frequency hopping manager as described with reference to FIGS. 11 through 14.

At 1830, the base station may receive the one or more repetitions of the uplink message over the first frequency resource and a second frequency resource according to the frequency hopping pattern. The operations of 1830 may be performed according to the methods described herein. In some examples, aspects of the operations of 1830 may be performed by a frequency hopping manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a configuration signal configuring a set of random access opportunities over which to transmit a preamble associated with a random access procedure, each random access opportunity associated with a set of one or more uplink data opportunities; identifying a repetition parameter for an uplink message; selecting a random access opportunity from the set of configured random access opportunities for transmitting the preamble based at least in part on the repetition parameter; transmitting the preamble on the selected random access opportunity; and transmitting one or more repetitions of the uplink message based at least in part on the set of one or more uplink data opportunities associated with the selected random access opportunity.

Aspect 2: The method of aspect 1, further comprising: determining that a second uplink message is to be transmitted; and selecting an arbitrary random access opportunity and corresponding uplink data opportunity for transmission of the second uplink message by selecting a preamble and a DMRS resource from a non-repetition-specific preamble group and a non-repetition-specific DMRS resource pool.

Aspect 3: The method of any of aspects 1 through 2, further comprising: determining, based at least in part on the repetition parameter, a number of repetitions of the uplink message; and selecting the random access opportunity based at least in part on a number of uplink data opportunities in the set of one or more uplink data opportunities associated with the selected random access opportunity and the number of repetitions of the uplink message.

Aspect 4: The method of any of aspects 1 through 3, further comprising: identifying reference signal resources based at least in part on the selected random access opportunity; and transmitting, in conjunction with transmission of the one or more repetitions of the uplink message, one or more reference signals using the reference signal resources.

Aspect 5: The method of any of aspects 1 through 4, further comprising: identifying, for each random access opportunity in the set of random access opportunities, an associated frequency hopping pattern; and selecting the random access opportunity based at least in part on the associated frequency hopping pattern.

Aspect 6: The method of any of aspects 1 through 5, further comprising: identifying, based at least in part on the selected random access opportunity, a frequency hopping pattern for the associated set of one or more uplink data opportunities; transmitting the preamble on the selected random access opportunity over a first frequency resource; and transmitting the one or more repetitions of the uplink message over the first frequency resource and a second frequency resource according to the frequency hopping pattern.

Aspect 7: The method of aspect 6, further comprising: transmitting the preamble over the first frequency resource during a first slot; and transmitting the at least one repetition of the uplink message over the second frequency resource during a second slot.

Aspect 8: The method of any of aspects 6 through 7, further comprising: identifying reference signal resources based at least in part on the selected random access opportunity, wherein the reference signal resources are the same across the first frequency resource and the second frequency resource.

Aspect 9: The method of any of aspects 1 through 8, wherein the set of one or more uplink data opportunities associated with a random access opportunity are repeated within an association period of a SSB-RO-preamble association or repeat across multiple association periods of the SSB-RO-preamble association, the association period of the SSB-RO-preamble association is identified in a RMSI.

Aspect 10: The method of aspect 9, wherein a length of the repetition pattern of the set of one or more uplink data opportunities associated with a random access opportunity is less than or equal to one association pattern period of the SSB-RO-preamble association identified in the RMSI.

Aspect 11: The method of any of aspects 9 through 10, wherein the repetition pattern of the set of one or more uplink data opportunities associated with a random access opportunity is repeated across multiple association pattern periods of the SSB-RO-preamble association identified in the RMSI.

Aspect 12: The method of any of aspects 1 through 11, further comprising: determining that the set of random access opportunities comprise multiple consecutive random access opportunities associated with the same SSB index within an association period, wherein the number of the multiple consecutive random access opportunities is at least the number of the one or more repetitions of the uplink message; and transmitting the one or more repetitions of the uplink message within the association period.

Aspect 13: The method of any of aspects 1 through 12, further comprising: determining that the set of random access opportunities comprise one or more random access opportunities associated with a SSB index within an association period, wherein a number of the one or more random access opportunities is less than a number of the one or more repetitions of the uplink message; and transmitting, based at least in part on the determining, the one or more repetitions of the uplink message across a plurality of association periods.

Aspect 14: The method of any of aspects 1 through 13, further comprising: determining that the set of one or more uplink data opportunities associated with the selected random access opportunities comprises an unused number of uplink data opportunities that is less than a threshold number of uplink data opportunities; and refraining from using the unused number of uplink data opportunities.

Aspect 15: The method of aspect 14, further comprising: reallocating the unused number of uplink data opportunities for a non-repetition-based uplink message.

Aspect 16: The method of any of aspects 1 through 15, wherein the configuration signal comprises at least one of a synchronization signal, or a system information signal, or a reference signal, or a RRC signal, or a combination thereof.

Aspect 17: A method for wireless communication at a base station, comprising: transmitting a configuration signal configuring a set of random access opportunities over which a UE is to transmit a preamble associated with a random access procedure, each random access opportunity associated with a set of one or more uplink data opportunities; receiving, from the UE, the preamble on a selected random access opportunity of the set of random access opportunities; and receiving, from the UE and according to a repetition parameter for an uplink message, one or more repetitions of the uplink message based at least in part on the set of one or more uplink data opportunities associated with the selected random access opportunity.

Aspect 18: The method of aspect 17, further comprising: identifying reference signal resources based at least in part on the selected random access opportunity; and receiving, in conjunction with receipt of the one or more repetitions of the uplink message, one or more reference signals using the reference signal resources.

Aspect 19: The method of any of aspects 17 through 18, further comprising: identifying, for each random access opportunity in the set of random access opportunities, an associated frequency hopping pattern, wherein the selected random access opportunity is based at least in part on the associated frequency hopping pattern.

Aspect 20: The method of any of aspects 17 through 19, further comprising: identifying, based at least in part on the selected random access opportunity, a frequency hopping pattern for the associated set of one or more uplink data opportunities; receiving the preamble on the selected random access opportunity over a first frequency resource; and receiving the one or more repetitions of the uplink message over the first frequency resource and a second frequency resource according to the frequency hopping pattern.

Aspect 21: The method of aspect 20, further comprising: receiving the preamble over the first frequency resource during a first slot; and receiving at least one repetition of the uplink message over the second frequency resource during a second slot.

Aspect 22: The method of any of aspects 20 through 21, further comprising: identifying reference signal resources based at least in part on the selected random access opportunity, wherein the reference signal resources are the same across the first frequency resource and the second frequency resource.

Aspect 23: The method of any of aspects 17 through 22, wherein the set of one or more uplink data opportunities associated with a random access opportunity are repeated within an association period of a SSB-ROpreamble association or repeat across multiple association periods of the SSB-RO-preamble association, the association period of the SSB-RO-preamble association is identified in a RMSI.

Aspect 24: The method of aspect 23, wherein a length of the repetition pattern of the set of one or more uplink data opportunities associated with a random access opportunity is less than or equal to one association pattern period of the SSB-RO-preamble association identified in the RMSI.

Aspect 25: The method of any of aspects 23 through 24, wherein the repetition pattern of the set of one or more uplink data opportunities associated with a random access opportunity is repeated across multiple association pattern periods of the SSB-RO-preamble association identified in the RMSI.

Aspect 26: The method of any of aspects 17 through 25, further comprising: determining that the set of random access opportunities comprise multiple consecutive random access opportunities associated with the same SSB index within an association period, wherein the number of the multiple consecutive random access opportunities is at least the number of the one or more repetitions of the uplink message; and receiving, based at least in part on the determining, the one or more repetitions of the uplink message within the association period.

Aspect 27: The method of any of aspects 17 through 26, further comprising: determining that the set of random access opportunities comprise one or more random access opportunities associated with a SSB index within an association period, wherein a number of the one or more random access opportunities is less than a number of the one or more repetitions of the uplink message; and receiving, based at least in part on the determining, the one or more repetitions of the uplink message across a plurality of association periods.

Aspect 28: The method of any of aspects 17 through 27, further comprising: determining that the set of one or more uplink data opportunities associated with the selected random access opportunities comprise an unused number of uplink data opportunities that cannot guarantee a preferred number of uplink data opportunities; and refraining from receiving the uplink message on the unused number of uplink data opportunities.

Aspect 29: The method of aspect 28, further comprising: reallocating the unused number of uplink data opportunities for a non-repetition-based uplink message.

Aspect 30: The method of any of aspects 17 through 29, wherein the configuration signal comprises at least one of a synchronization signal, or a system information signal, or a reference signal, or a RRC signal, or a combination thereof.

Aspect 31: An apparatus for wireless communication at a UE, comprising a processor; memory coupled with the processor; and instructions stored in the memory and executable by the processor to cause the apparatus to perform a method of any of aspects 1 through 16.

Aspect 32: An apparatus for wireless communication at a UE, comprising at least one means for performing a method of any of aspects 1 through 16.

Aspect 33: A non-transitory computer-readable medium storing code for wireless communication at a UE, the code comprising instructions executable by a processor to perform a method of any of aspects 1 through 16.

Aspect 34: An apparatus for wireless communication at a base station, comprising a processor; memory coupled with the processor; and instructions stored in the memory and executable by the processor to cause the apparatus to perform a method of any of aspects 17 through 30.

Aspect 35: An apparatus for wireless communication at a base station, comprising at least one means for performing a method of any of aspects 17 through 30.

Aspect 36: A non-transitory computer-readable medium storing code for wireless communication at a base station, the code comprising instructions executable by a processor to perform a method of any of aspects 17 through 30.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a configuration signal configuring a set of random access opportunities over which to transmit a preamble associated with a random access procedure, each random access opportunity associated with a set of one or more uplink data opportunities, wherein the set of one or more uplink data opportunities are repeated within an association period of a synchronization signal block (SSB)-random access opportunity (RO)-preamble association or across multiple association periods of the SSB-RO-preamble association, wherein the association period of the SSB-RO-preamble association is identified in a remaining minimum system information (RMSI);
identifying a repetition parameter for an uplink message;
selecting a random access opportunity from the set of configured random access opportunities for transmitting the preamble based at least in part on the repetition parameter;
transmitting the preamble on the selected random access opportunity; and
transmitting one or more repetitions of the uplink message based at least in part on the set of one or more uplink data opportunities associated with the selected random access opportunity.

2. The method of claim 1, further comprising:
determining that a second uplink message is to be transmitted; and
selecting an arbitrary random access opportunity and corresponding uplink data opportunity for transmission of the second uplink message by selecting a preamble and a demodulation reference signal resource from a non-repetition-specific preamble group and a non-repetition-specific demodulation reference signal resource pool.

3. The method of claim 1, further comprising:
determining, based at least in part on the repetition parameter, a number of repetitions of the uplink message; and
selecting the random access opportunity based at least in part on a number of uplink data opportunities in the set of one or more uplink data opportunities associated with the selected random access opportunity and the number of repetitions of the uplink message.

4. The method of claim 1, further comprising:
identifying reference signal resources based at least in part on the selected random access opportunity; and
transmitting, in conjunction with transmission of the one or more repetitions of the uplink message, one or more reference signals using the reference signal resources.

5. The method of claim 1, further comprising:
identifying, for each random access opportunity in the set of random access opportunities, an associated frequency hopping pattern; and
selecting the random access opportunity based at least in part on the associated frequency hopping pattern.

6. The method of claim 1, further comprising:
identifying, based at least in part on the selected random access opportunity, a frequency hopping pattern for the associated set of one or more uplink data opportunities;
transmitting the preamble on the selected random access opportunity over a first frequency resource; and
transmitting the one or more repetitions of the uplink message over the first frequency resource and a second frequency resource according to the frequency hopping pattern.

7. The method of claim 6, further comprising:
transmitting the preamble over the first frequency resource during a first slot; and
transmitting the at least one repetition of the uplink message over the second frequency resource during a second slot.

8. The method of claim 6, further comprising:
identifying reference signal resources based at least in part on the selected random access opportunity, wherein the reference signal resources are the same across the first frequency resource and the second frequency resource.

9. The method of claim 1, wherein a length of a repetition pattern of the set of one or more uplink data opportunities associated with a random access opportunity is less than or equal to one association pattern period of the SSB-RO-preamble association identified in the RMSI.

10. The method of claim 1, wherein a repetition pattern of the set of one or more uplink data opportunities associated with a random access opportunity is repeated across multiple association pattern periods of the SSB-RO-preamble association identified in the RMSI.

11. The method of claim 1, further comprising:
determining that the set of random access opportunities comprise multiple consecutive random access opportunities associated with a same synchronization signal block (SSB) index within the association period, wherein the number of the multiple consecutive random access opportunities is at least the number of the one or more repetitions of the uplink message; and
transmitting the one or more repetitions of the uplink message within the association period.

12. The method of claim 1, further comprising:
determining that the set of random access opportunities comprise one or more random access opportunities associated with a synchronization signal block (SSB) index within the association period, wherein a number of the one or more random access opportunities is less than a number of the one or more repetitions of the uplink message; and
transmitting, based at least in part on the determining, the one or more repetitions of the uplink message across a plurality of association periods.

13. The method of claim 1, further comprising:
determining that the set of one or more uplink data opportunities associated with the selected random access opportunity comprises an unused number of uplink data opportunities that is less than a threshold number of uplink data opportunities; and
refraining from using the unused number of uplink data opportunities.

14. The method of claim 13, further comprising:
reallocating the unused number of uplink data opportunities for a non-repetition-based uplink message.

15. The method of claim 1, wherein the configuration signal comprises at least one of a synchronization signal, or a system information signal, or a reference signal, or a radio resource control (RRC) signal, or a combination thereof.

16. A method for wireless communication at a base station, comprising:
transmitting a configuration signal configuring a set of random access opportunities over which a user equipment (UE) is to transmit a preamble associated with a random access procedure, each random access opportunity associated with a set of one or more uplink data opportunities, wherein the set of one or more uplink data opportunities are repeated within an association period of a synchronization signal block (SSB)-random access opportunity (RO)-preamble association or across multiple association periods of the SSB-RO-preamble association, wherein the association period of the SSB-RO-preamble association is identified in a remaining minimum system information (RMSI);
receiving, from the UE, the preamble on a selected random access opportunity of the set of random access opportunities; and
receiving, from the UE and according to a repetition parameter for an uplink message, one or more repetitions of the uplink message based at least in part on the set of one or more uplink data opportunities associated with the selected random access opportunity.

17. The method of claim 16, further comprising:
identifying reference signal resources based at least in part on the selected random access opportunity; and
receiving, in conjunction with receipt of the one or more repetitions of the uplink message, one or more reference signals using the reference signal resources.

18. The method of claim 16, further comprising:
identifying, for each random access opportunity in the set of random access opportunities, an associated frequency hopping pattern, wherein the selected random access opportunity is based at least in part on the associated frequency hopping pattern.

19. The method of claim 16, further comprising:
identifying, based at least in part on the selected random access opportunity, a frequency hopping pattern for the associated set of one or more uplink data opportunities;
receiving the preamble on the selected random access opportunity over a first frequency resource; and
receiving the one or more repetitions of the uplink message over the first frequency resource and a second frequency resource according to the frequency hopping pattern.

20. The method of claim 19, further comprising:
receiving the preamble over the first frequency resource during a first slot; and
receiving at least one repetition of the uplink message over the second frequency resource during a second slot.

21. The method of claim 19, further comprising:
identifying reference signal resources based at least in part on the selected random access opportunity, wherein the reference signal resources are the same across the first frequency resource and the second frequency resource.

22. The method of claim 16, wherein a length of a repetition pattern of the set of one or more uplink data opportunities associated with a random access opportunity is less than or equal to one association pattern period of the SSB-RO-preamble association identified in the RMSI.

23. The method of claim 16, wherein a repetition pattern of the set of one or more uplink data opportunities associated with a random access opportunity is repeated across multiple association pattern periods of the SSB-RO-preamble association identified in the RMSI.

24. The method of claim 16, further comprising:
determining that the set of random access opportunities comprise multiple consecutive random access opportunities associated with a same synchronization signal block (SSB) index within the association period, wherein the number of the multiple consecutive random access opportunities is at least the number of the one or more repetitions of the uplink message; and
receiving, based at least in part on the determining, the one or more repetitions of the uplink message within the association period.

25. The method of claim 16, further comprising:
determining that the set of random access opportunities comprise one or more random access opportunities associated with a synchronization signal block (SSB) index within the association period, wherein a number of the one or more random access opportunities is less than a number of the one or more repetitions of the uplink message; and
receiving, based at least in part on the determining, the one or more repetitions of the uplink message across a plurality of association periods.

26. The method of claim 16, further comprising:
determining that the set of one or more uplink data opportunities associated with the selected random access opportunity comprise an unused number of uplink data opportunities that cannot guarantee a preferred number of uplink data opportunities; and
refraining from receiving the uplink message on the unused number of uplink data opportunities.

27. An apparatus for wireless communication at a user equipment (UE), comprising:
a processor,
memory coupled with the processor; and
instructions stored in the memory and executable by the processor to cause the apparatus to:
receive a configuration signal configuring a set of random access opportunities over which to transmit a preamble associated with a random access procedure, each random access opportunity associated with a set of one or more uplink data opportunities, wherein the set of one or more uplink data opportunities are repeated within an association period of a synchronization signal block (SSB)-random access opportunity (RO)-preamble association or across multiple association periods of the SSB-RO-preamble association, wherein the association period of the SSB-RO-preamble association is identified in a remaining minimum system information (RMSI);
identify a repetition parameter for an uplink message;
select a random access opportunity from the set of configured random access opportunities for transmitting the preamble based at least in part on the repetition parameter;
transmit the preamble on the selected random access opportunity; and
transmit one or more repetitions of the uplink message based at least in part on the set of one or more uplink data opportunities associated with the selected random access opportunity.

28. An apparatus for wireless communication at a base station, comprising:
a processor,
memory coupled with the processor; and
instructions stored in the memory and executable by the processor to cause the apparatus to:
transmit a configuration signal configuring a set of random access opportunities over which a user equipment (UE) is to transmit a preamble associated with a random access procedure, each random access opportunity associated with a set of one or more uplink data opportunities, wherein the set of one or more uplink data opportunities are repeated within an association period of a synchronization signal block (SSB)-random access opportunity (RO)-preamble association or across multiple association periods of the SSB-RO-preamble association, wherein the association period of the SSB-RO-preamble association is identified in a remaining minimum system information (RMSI);

receive, from the UE, the preamble on a selected random access opportunity of the set of random access opportunities; and receive, from the UE and according to a repetition parameter for an uplink message, one or more repetitions of the uplink message based at least in part on the set of one or more uplink data opportunities associated with the selected random access opportunity.

* * * * *